United States Patent [19]

Inoue

[11] Patent Number: 5,729,676
[45] Date of Patent: Mar. 17, 1998

[54] METHOD OF GENERATING DATA FOR EVALUATING PROGRAMS

[75] Inventor: Masaharu Inoue, Tokyo, Japan

[73] Assignee: NEC Corporation, Tokyo, Japan

[21] Appl. No.: 337,469

[22] Filed: Nov. 8, 1994

[30] Foreign Application Priority Data

Dec. 10, 1993 [JP] Japan .................................. 5-310237

[51] Int. Cl.$^6$ ...................................................... G06F 9/42
[52] U.S. Cl. .................... 395/183.14; 395/183.22; 395/708; 395/702; 395/703; 395/382; 395/704; 395/709
[58] Field of Search ....................................... 395/375, 650, 395/183.14, 382, 702, 703, 704, 708, 709, 183.13, 183.22

[56] References Cited

U.S. PATENT DOCUMENTS

| 939,010 | 10/1909 | Bender et al. | 395/183.14 |
| 4,802,165 | 1/1989 | Ream | 395/183.14 |
| 4,819,233 | 4/1989 | Delucia et al. | 395/183.14 |
| 5,050,068 | 9/1991 | Dollas et al. | 395/382 |
| 5,193,180 | 3/1993 | Hastings | 395/375 |
| 5,381,548 | 1/1995 | Matsuo | 395/703 |

FOREIGN PATENT DOCUMENTS

| 1100642 | 4/1989 | Japan . |
| 3271949 | 12/1991 | Japan . |
| 4111024 | 4/1992 | Japan . |
| 4-137146 | 5/1992 | Japan . |
| 4260941 | 9/1992 | Japan . |
| 4271440 | 9/1992 | Japan . |

OTHER PUBLICATIONS

Offutt, An Integrated System for Automatically Generating Test Data, IEEE 1990, pp. 694–701.
Yamaguchi, et al. "Ada Test Evaluation Support System by Using Intermediate Language", National Symposium, Information Processing Society of Japan, No. 27, 1983, pp. 561–562.

*Primary Examiner*—Krisna Lim
*Assistant Examiner*—Patrice L. Hinder
*Attorney, Agent, or Firm*—Whitham, Curtis, Whitham & McGinn

[57] ABSTRACT

A method of generating data for evaluating a source program comprising a program dividing process of reading the source program for controlling the operation of an information processing system and dividing the source program into program blocks each time a branch instruction and a label are detected and generating basic block data every program blocks, a variable data extracting process of extracting variable data for substituting and referring to a calling variable in the source program, a branch data generating process of generating branch data between the program blocks, for shifting from one program block to the other program block and storing the generated branch data, a path data generating process of generating path data for each processing path of the source program in order of the sequential program blocks, based on the variable data and the branch data, and a test data generating process of generating data for testing the source program from the path data and the variable data. Further, the method may preferably have a path data selecting process of selecting data about a main path from the path data and a test data generating process of generating test data from the path data selected by the path data selecting process and the variable data.

8 Claims, 43 Drawing Sheets

```
1:          public int tonumber (char c, int radix)
2:          {
3:            int n;
4:
5:   X        if (isdigit(c))
6:   X          n=c-'0';
7:   X        else if (isupper(c))
8:            n=c-'A'+10;
9:   X        else if (islower(c))
10:  X          n=c-'a'+10;
11:           else
12:             return-1;
13:  X        return n<radix?n:-1;
14:         }
```

FIG.10A

| BLOCK NO. 121 | START LINE 122 | LAST LINE 123 | HEAD LABEL 124 | "BRANCH" 125 | BRANCH-TO 126 | | FLAG SET 126b | BRANCH DATA 127 | |
|---|---|---|---|---|---|---|---|---|---|
| | | | | | BLOCK NO. 126a | LABEL | | 1ST OPERAND 127b | 2ND OPERAND 127c |
| 1 | 6 | 14 | NULL | JNE | | BR1 | CMP | FNAME[BX] | 'R' |
| 2 | 15 | 15 | NULL | NULL | | | | | |
| | 16 | 17 | BR1 | JNE | | BR2 | CMP | FNAME[BX] | 'W' |

FIG.10B

| BLOCK NO. 141 | PROCEEDING BLOCK 142 | CONDITION 143 |
|---|---|---|
| 1 | START | NULL |
| 3 | 1 | FNAME!='R' |

FIG.10C

| BLOCK NO. 161 | ARRIVAL CONDITION 162 | |
|---|---|---|
| START | 1 | NULL |
| | 2 | FNAME=='R' |
| | 3 | FNAME!='R' |

```
       1: CODE SEGMENT
       2:    ASSUME CS:CODE, DC:CODE, SS:CODE
       3:    ORG  80H
       4: FNAME DB    128DUP(?)
       5:
       6: START:MOV  BL,FNAME
(a)-   7:    XOR  BH,BH
       8:    MOV  BYTE PTR FNAME [BX-1], 0
       9:    MOV  AH,43H
      10:    MOV  DX,OFFSET FNAME+2
      11:    MOV  AL,0
      12:    INT  21H
(b)- 13:    CMP  FNAME[BX],'R'  ;read only
      14:    JNE  BR1
      15:    OR   CX, 1
(c)- 16: BR1: CMP  FNAME[BX], 'W'  ;r/w
      17:    JNE  BR2
(d)- 18:    AND  CX, 0FFFEH
      19: BR2: MOV  AH, 43H
      20:    MOV  DX, OFFSET FNAME+2
      21:    MOV  AL,1
      22:    INT  21H
      23:    MOV  AH,4CH
      24:    INT  21H
      25: CODE ENDS
      26:    END  START
```

| FLAG | INSTRUCTION | 1ST OPERAND | 2ND OPERAND |
| --- | --- | --- | --- |
| OF | XOR | BH | BH |
| DF | | | |
| IF | | | |
| TF | | | |
| SF | XOR | BH | BH |
| ZF | XOR | BH | BH |
| AF | XOR | BH | BH |
| PF | XOR | BH | BH |
| CF | XOR | BH | BH |

FIG.16B

| FLAG | INSTRUCTION | 1ST OPERAND | 2ND OPERAND |
| --- | --- | --- | --- |
| OF | CMP | FNAME[BX] | 'R' |
| DF | | | |
| IF | | | |
| TF | | | |
| SF | CMP | FNAME[BX] | 'R' |
| ZF | CMP | FNAME[BX] | 'R' |
| AF | CMP | FNAME[BX] | 'R' |
| PF | CMP | FNAME[BX] | 'R' |
| CF | CMP | FNAME[BX] | 'R' |

FIG.16C

| FLAG | INSTRUCTION | 1ST OPERAND | 2ND OPERAND |
| --- | --- | --- | --- |
| OF | CMP | FNAME[BX] | 'W' |
| DF | | | |
| IF | | | |
| TF | | | |
| SF | CMP | FNAME[BX] | 'W' |
| ZF | CMP | FNAME[BX] | 'W' |
| AF | CMP | FNAME[BX] | 'W' |
| PF | CMP | FNAME[BX] | 'W' |
| CF | CMP | FNAME[BX] | 'W' |

FIG.16D

| FLAG | INSTRUCTION | 1ST OPERAND | 2ND OPERAND |
| --- | --- | --- | --- |
| OF | AND | CX | 0FFFEH |
| DF | | | |
| IF | | | |
| TF | | | |
| SF | AND | CX | 0FFFEH |
| ZF | AND | CX | 0FFFEH |
| AF | AND | CX | 0FFFEH |
| PF | AND | CX | 0FFFEH |
| CF | AND | CX | 0FFFEH |

FIG. 17A

| BLOCK NO. (121) | START LINE (122) | LAST LINE (123) | HEAD LABEL (124) | "BRANCH" (125) | BRANCH-TO (126) | | BRANCH DATA (120) | | |
|---|---|---|---|---|---|---|---|---|---|
| | | | | | BLOCK NO. (126a) | LABEL (126b) | FLAG SET (127a) | 1ST OPERAND (127b) | 2ND OPERAND (127c) |
| 1 | 6 | 14 | NULL | JNE | | BR1 | CMP | FNAME[BX] | 'R' |
| 2 | 15 | 15 | NULL | NULL | | | | | |
| 3 | 16 | 17 | BR1 | JNE | | BR2 | CMP | FNAME[BX] | 'W' |
| 4 | 18 | 18 | NULL | NULL | | | | | |
| 5 | 19 | 24 | BR2 | NULL | | | | | |

FIG. 17B

| BLOCK NO. | START LINE | LAST LINE | HEAD LABEL | "BRANCH" | BRANCH-TO | | BRANCH DATA | | |
|---|---|---|---|---|---|---|---|---|---|
| | | | | | BLOCK NO. | LABEL | FLAG SET | 1ST OPERAND | 2ND OPERAND |
| 1 | 6 | 14 | NULL | JNE | 3 | BR1 | CMP | FNAME[BX] | 'R' |
| 2 | 15 | 15 | NULL | NULL | | | | | |
| 3 | 16 | 17 | BR1 | JNE | 5 | BR2 | CMP | FNAME[BX] | 'W' |
| 4 | 18 | 18 | NULL | NULL | | | | | |
| 5 | 19 | 24 | BR2 | NULL | | | | | |

FIG.18A

| BLOCK NO. /141 | PROCEEDING BLOCK NO. /142 | CONDITION /143 /140 |
|---|---|---|
| 1 | START | NULL |
| 3 | 1 | FNAME!='R' |

FIG.18B

| 1 | START | NULL |
|---|---|---|
| 2 | 1 | FNAME=='R' |
| 3 | 1 | FNAME!='R' |

FIG.18C

| 1 | START | NULL |
|---|---|---|
| 2 | 1 | FNAME=='R' |
| 3 | 1 | FNAME!='R' |
|   | 2 | NULL |

FIG.19

| BLOCK NO. /141 | PROCEEDING BLOCK NO. /142 | CONDITION /143 /140 |
|---|---|---|
| 1 | START | NULL |
| 2 | 1 | FNAME=='R' |
| 3 | 1 | FNAME!='R' |
|   | 2 | NULL |
| 4 | 3 | FNAME!='W' |
| 5 | 3 | FNAME!='W' |
|   | 4 | NULL |

FIG.20A

| | BLOCK NO. | ARRIVAL CONDITION |
|---|---|---|
| B E G I N N I N G | 1 | NULL |
| | 2 | FNAME=='R' |
| | 3 | FNAME!='R' |
| | 4 | FNAME=='R' |
| | 5 | |

FIG.20B

| | BLOCK NO. | ARRIVAL CONDITION |
|---|---|---|
| M I D D L E | 1 | NULL |
| | 2 | FNAME=='R' |
| | 3 | NULL |
| | 4 | FNAME=='W' |
| | 5 | FNAME!='W' |
| | | FNAME=='W' |

FIG.20C

| | BLOCK NO. | ARRIVAL CONDITION |
|---|---|---|
| F I N I S H | 1 | NULL |
| | 2 | FNAME=='R' |
| | 3 | NULL |
| | 4 | FNAME=='W' |
| | 5 | NULL |

| BLOCK NO. | START LINE | LAST LINE | HEAD LABEL | BRANCH INSTRUCTION | BRANCH-TO | | FLAG SET | 1ST OPERAND | 2ND OPERAND | ARRIVAL CONDITION |
| --- | --- | --- | --- | --- | --- | --- | --- | --- | --- | --- |
| | | | | | BLOCK NO. | LABEL | | | | |
| 1 | 6 | 14 | NULL | JNE | 3 | BR1 | CMP | FNAME[BX] | 'R' | NULL |
| 2 | 15 | 15 | NULL | NULL | | | | | | FNAME=='R' |
| 3 | 16 | 16 | BR1 | JNE | 5 | BR2 | CMP | FNAME[BX] | 'W' | FNAME!='R' |
| 4 | 18 | 18 | NULL | NULL | | | | | | FNAME=='R' |
| 5 | 19 | 24 | BR2 | NULL | | | | | | |

FIG.21

```
 23:    main()
 24:    {
 36:      selnol=dantinp_di(dl);
 40:      selno=dantinp_di(dl);
 45:      dmax=dantinp_di(dl);
 90:      if(selnol=1){
 91:        searchcs(dmax,selno);
 92:      }
113:    }

210:    searchcs(dmax,csno)
211:      int dmax;
212:      int csno;
213:    {
214:      switch(csno){
216:        case2:searchac21(dmax);break;
220:      }
221:    }

235:    search21(dmax)
236:      int dmax;
237:    {
238:      int cx, dx, si, di;
239:      int dmin=0;
240:      cx=0; si=dmin; di=dmax-1;
241:      do{
242:        if(di-si<0)
243:          goto SCS21;
244:        dx=(di+si)/2;
245:        if(strcmpi(keycode,scode[dx])<0)
246:          di=dx-1;
247:        if(strcmpi(keycode,scode[dx])>0)
248:          si=dx+1;
249:      } while(strcmpi(keycode,scode[dx]!=0);
250:      cx=1; dno[cx]=dx;
251:    SCS21:
252:      dno[0]=cx;
253:    }
```

FIG.22A

```
001 :|*** main()
002 :|***  {
003 : Line 24
004     PUBLIC    _main
005 _main    PROC   NEAR
006     xor    ax,ax
007     call   _chkstk
008 :|***  selnol=datinp_di(dl);
009 :Line 36
010     push   WORD PTR_dl
011     call   _datinp_di
012     add    sp.2
013     mov    WORD PTR_selno.ax
017 :|***  selno=datinp_di(dl);
015 :Line 40
016     push   WORD PTR_dl
017     call   _datinp_di
018     add    sp.2
019     mov    WORD PTR_selno.ax
020 :|***  dmax=datinp_di(dl);
021 :Line 45
022     push   WORD PTR_dl
023     call   _datinp_di
024     add    sp.2
025     mov    WORD PTR_dmax,ax
026 :|***  if(selnol==1){
027 :Line 90
028     cmp    WORD PTR_selnol.1
029     jne
030 :|***  searchcs(dmax,selno);
031 :Line 91
032     push   WORD PTR_selno
033     push   ax
034     call   _searchcs
035     add    sp.4
036 :|***    }
037 :Line 92
038 :|***  }
039 :Line 113
040 $1110:
041    rct
042    nop
043
044 _main   ENDP 045 :|***
046 :|***  searchcs(dmax,csno)
047 :|***    int dmax;
048 :Line 211
049     PUBLIC    _searchcs
050 _searchcs  PROC   NEAR
051     push   bp
052     mov    bp,sp
053     xor    ax.ax
054     call   _chkstk
055 :|***    int csno;
056 :|***  {
057 :Line 212
058 :   dmax=4
059 :   csno=6
060 :|***  switch(csno){
061 :Line 213
062     mov    ax,WORD PTR[bp+6]    ;csno
063     cmp    ax.2
064     jne    SSB116
065     push   WORD PTR[bp+4]       ;dmax
067     call   _searchac21
068     add    sp.2
069 SSB116;
070 :|***   case 2: serchac21(dmax);break;
071 :|***   }
072 :|***  }
073 :Line 221
074     pop    bp
075     ret
076     nop
077
078 _searchcs  ENDP
```

FIG.22B

| FUNCTION NAME | CALLING FUNCTION FUNCTION | CALLING FUNCTION BLOCK | BLOCK NO. | START LINE | LAST LINE | HEAD LABEL | BRANCH INSTRUCTION | BRANCH-TO BLOCK | BRANCH-TO LABEL | CONDITION |
|---|---|---|---|---|---|---|---|---|---|---|
| main. | START | | 1-35 | 91 | 91 | | | | | |
| searches | main | 1-35 | 2-2 | 216 | 216 | | BREAK | 2-4 | $k113 | NULL |
| search21 | searches | 2-2 | 3-1 | 239 | 240 | NULL | NULL | | | |
| | | | 3-2 | 241 | 241 | $D111 | NULL | | | |
| | | | 3-3 | 242 | 243 | NULL | IF | 3-10 | $SCS 21115 | di-si<0 |
| | | | 3-4 | 244 | 245 | NULL | NULL | | | |
| | | | 3-5 | 246 | 246 | NULL | IF | 3-6 | $1117 | *(fx)<0 |
| | | | 3-6 | 247 | 247 | $1117 | NULL | | | |
| | | | 3-7 | 248 | 248 | NULL | IF | 3-8 | $1118 | *(fx)>0 |
| | | | 3-8 | 249 | 249 | $1118 | NULL | | | |
| | | | 3-9 | 250 | 250 | NULL | DO-WHILE | 3-2 | $D111 | *(fx)!=0 |
| | | | 3-10 | 251 | 251 | $SCS 21115 | NULL | | | |
| | | | 3-11 | 252 | 252 | NULL | NULL | | | |

*(fx)=strcmpi (keycode,scode[dx])

| BLOCK NO. | PROCEEDING BLOCK | BRANCH CONDITION |
|---|---|---|
| 3-1 | START | NULL |
| 3-2 | 3-1<br>3-9 | strcmpi (keycode, scode[dx])!=0<br>strcmpi (keycode, scode[dx])!=0 |
| 3-3 | 3-2 | di-si<0 |
| 3-4 | 3-2 | di-si>0 |
| 3-5 | 3-4 | NULL |
| 3-6 | 3-5 | strcmpi (keycode, scode[dx])<0 |
| 3-7 | 3-5<br>3-6 | strcmpi (keycode, scode[dx])<=0<br>NULL |
| 3-8 | 3-7 | strcmpi (keycode, scode[dx])>0 |
| 3-9 | 3-7<br>3-8 | strcmpi (keycode, scode[dx])<=0<br>NULL |
| 3-10 | 3-1<br>3-9 | strcmpi (keycode, scode[dx])==0<br>strcmpi (keycode, scode[dx])==0 |
| 3-11 | 3-3<br>3-10 | NULL<br>NULL |

FIG.25

| FUNCTION NAME | CALLING FUNCTION | CALLING BLOCK | BLOCK NO. | START LINE | LAST LINE | ARRIVAL CONDITION |
|---|---|---|---|---|---|---|
| main | START | | 1-35 | 91 | 91 | seln01==1 |
| searchcs | main | 1-35 | 2-2 | 216 | 216 | csno==2 |
| search21 | searchcs | 2-2 | 3-1 | 239 | 240 | NULL |
| | | | 3-2 | 241 | 241 | NULL |
| | | | 3-3 | 242 | 243 | NULL |
| | | | 3-4 | 244 | 245 | di-si>=0 |
| | | | 3-5 | 246 | 246 | di-si>=0 strcmpi (keycode, scode[dx])>=0 |
| | | | 3-6 | 247 | 247 | NULL |
| | | | 3-7 | 248 | 248 | di-si>=0 strcmpi (keycode, scode[dx])==0 |
| | | | 3-8 | 249 | 249 | di-si>=0 |
| | | | 3-9 | 250 | 250 | di-si>=0 |
| | | | 3-10 | 251 | 251 | NULL |
| | | | 3-11 | 252 | 252 | NULL |

| FUNCTION | BLOCK NO. |
|---|---|
| search21 | 3-5 |

| START LINE | LAST LINE |
|---|---|
| 246 | 246 |

| SHIFT/BRANCH CONDITION |
|---|
| di-si>=0<br>strcmpi (keycode, scode[dx])>=0 |

| FUNCTION | CALLED BY |
|---|---|
| search21 | searchcs |

| CALLING CONDITION |
|---|
| csno=2 |

| FUNCTION | CALLED BY |
|---|---|
| searches | main |

| CALLING CONDITION |
|---|
| selno1=1 |

FIG.28

| PATH NO. | BLOCK NO. | CONDITION | VARIABLE |
|---|---|---|---|
| 1 | 1-1 | data 1≤100 | fscanf (fp, "%x", &buf1);<br>fscanf (fp, "%x", &buf2);<br>data1=buf1+buf2+1; |
| | 1-2 | NULL | |
| ≈ | ≈ | ≈ | |
| | 1-4 | | NULL |
| 2 | 1-1 | data 1≤100 | fscanf (fp, "%x", &buf1);<br>fscanf (fp, "%x", &buf2);<br>data1=buf1+buf2+1; |
| m | n | NULL | |

| I\J | 1 | 2 | 3 | 4 | 5 | 6 | 7 | 8 | ΣEI,0 | $C_I$ |
|---|---|---|---|---|---|---|---|---|---|---|
| 1 | 1 | 1 | 1 | 0 | 1 | 1 | 0 | 1 | 6 | 0 |
| 2 | 1 | 0 | 1 | 0 | 1 | 0 | 0 | 1 | 4 | 0 |
| 3 | 0 | 1 | 0 | 0 | 0 | 1 | 0 | 0 | 2 | 0 |
| (4) | 0 | 0 | (1) | ((1)) | 0 | 0 | 0 | (1) | (3) | (1) |
| (5) | 0 | 1 | 1 | 0 | 0 | 0 | ((1)) | (1) | (4) | (1) |
| 6 | 1 | 0 | 1 | 0 | 1 | 0 | 0 | 0 | 3 | 0 |
| ΣE0,J | 3 | 3 | 5 | ((1)) | 3 | 2 | ((1)) | 4 | | |

FIG.35B

| I\J | 1 | | | | 5 | 6 | | | ΣEI,0 | $C_I$ |
|---|---|---|---|---|---|---|---|---|---|---|
| (1) | 1 | | | | 1 | 1 | | | (3) | (1) |
| 2 | 1 | | | | 1 | 0 | | | 2 | 0 |
| 3 | 0 | | | | 0 | 1 | | | 1 | 0 |
| | | | | | | | | | | 1 |
| | | | | | | | | | | 1 |
| 6 | 1 | | | | 1 | 0 | | | 2 | 0 |
| ΣE0,J | 3 | | | | 3 | 2 | | | | |

| I \ J | BLOCK NO. | | | | | | | |
|---|---|---|---|---|---|---|---|---|
| | 1 | 2 | 3 | 4 | 5 | 6 | 7 | 8 |
| PATH 1 | 1 | 1 | 1 | 0 | 1 | 1 | 0 | 1 |
| PATH 4 | 0 | 0 | 1 | 1 | 0 | 0 | 0 | 1 |
| PATH 5 | 0 | 1 | 1 | 0 | 0 | 0 | 1 | 1 |

FIG.35C

```
001  #define          FILE              struct _iobuf
002  static void main(void);
003  static void sub1(void);
004  static void sub2(void);
005
006  extern           struct          _iobuf {
007       int          _cnt;
008       unsigned char  *_ptr;
009       unsigned char  *_base;
010       int          _bufsiz;
011       short        _flag;
012       char         _file;
013  } _iob( );
014
015  extern int fscanf( );
016  extern int printf( );
017  extern FILE *fp;
018
019
020  int    buf1,buf2,buf3,data1,data2;
021
022  void main(void){
023       fscanf(fp, "%x", &buf1);
024       fscanf(fp, "%x", %buf2);
025
026       data1 = buf1 + buf2;
027       data1++;
028       if (data1 == 100) {
029            sub1( );
030       } else {
031            sub2( );
032       }
033  }
034
035  void sub1(void) {
036       fscanf(fp, "%x", &buf3);
037       data2 = data1 + buf3;
038       if (data2 > 200) {
039            printf("buf1 + 1 + buf2 + buf3 > 200 \n");
040       } else {
041            printf("buf1 + 1 + buf2 + buf3 <= 200 \n");
042       }
043  }
044
045  void sub2(void) {
046       fscanf(fp, "%x", &buf3);
047       data2 = data1 + buf3;
048       if (data2 > 200) {
049            printf("buf1 + 1 + buf2 + buf3 > 200 \n");
050       } else {
051            printf ("buf1 + 1 + buf2 + buf3 <= 200 \n");
052       }
053  }
```

FIG.36

| FUNCTION | main | | | |
|---|---|---|---|---|
| CALLED BY | START | | | |
| BLOCK NO. | | | | |
| BLOCK NO. | 1-1 | 1-2 | 1-3 | 1-4 |
| START LINE | 22 | 29 | 30 | 32 |
| LAST LINE | 28 | 29 | 31 | 33 |
| HEAD LABEL | main | NULL | L0005 | L0006 |
| BRANCH | | | | |
| CONDITION | IF | GOTO | NULL | RETURN |
| | data1 ?= 100 | | | |
| BLOCK NO. | 1-3 | 1-4 | | |
| LABEL | L0005 | L0006 | | |
| ARRIVE | | | | |
| BLOCK NO. | NULL | 1-1 | 1-1 | NULL |
| CONDITION | NULL | data1 == 100 | data1 ?= 100 | NULL |
| VARIABLE | fscanf(fp,"%x",&buf1) fscanf(fp,"%x",&buf2) data1=buf1+buf2 data1++ | sub1( ); | sub2( ); | NULL |

| | | | | |
|---|---|---|---|---|
| FUNCTION | sub 1 | | | |
| CALLED BY | main | | | |
| BLOCK NO. | 1-1 | | | |
| BLOCK NO. | 2-1 | 2-2 | 2-3 | 2-4 |
| START LINE | 35 | 39 | 40 | 42 |
| LAST LINE | 38 | 39 | 41 | 43 |
| HEAD LABEL | main | NULL | L0010 | L0011 |
| BRANCH | IF | GOTO | NULL | RETURN |
| CONDITION | data2 <= 200 | NULL | | NULL |
| BLOCK NO. | 2-3 | 2-4 | | |
| LABEL | L0010 | L0011 | | |
| ARRIVE | NULL | 2-1 | 2-1 | NULL |
| BLOCK NO. | | | | |
| CONDITION | | data2 > 200 | data2 <= 200 | NULL |
| VARIABLE | fscanf(fp,"%x",&buf3) data2=data1+buf3 | NULL | NULL | NULL |

| FUNCTION | | | | |
|---|---|---|---|---|
| CALLED BY | sub 2 | | | |
| BLOCK NO. | main | | | |
| | 1-1 | | | |
| BLOCK NO. | 3-1 | 3-2 | 3-3 | 3-4 |
| START LINE | 45 | 49 | 50 | 52 |
| LAST LINE | 48 | 49 | 51 | 53 |
| HEAD LABEL | main | NULL | L0017 | L0018 |
| BRANCH | | | | |
| CONDITION | IF | GOTO | NULL | RETURN |
| | data 2 > 200 | NULL | | NULL |
| BLOCK NO. | 3-3 | 3-4 | | |
| LABEL | L0017 | L0018 | | |
| ARRIVE | | | | |
| BLOCK NO. | NULL | 3-1 | 3-1 | NULL |
| CONDITION | | data 2 > 200 | data 2 <= 200 | NULL |
| VARIABLE | fscanf(fp,"%x",&buf 3) data 2=data 1+buf 3 | NULL | NULL | NULL |

| BLOCK | VARIABLE | PATH NO. 1 | 2 | 3 | 4 |
|---|---|---|---|---|---|
| 1-1 | fscanf(fp,"%x",&buf 1); fscanf(fp,"%x",&buf 2); data 1=buf 1+buf 2+1 | data 1 ≤ 100 | data 1 ≤ 100 | data 1 > 100 | data 1 > 100 |
| 1-2 | | NULL | NULL | | |
| 1-3 | fscanf(fp,"%x",&buf 3); data 2=data 1+buf 3; | data 2 ≤ 200 | data 2 > 200 | | |
| 2-1 | | NULL | NULL | | |
| 2-2 | NULL | | NULL | | |
| 2-3 | NULL | | | | |
| 2-4 | NULL | | | | |
| 3-1 | fscanf(fp,"%x",&buf 3); data 2=data 1+buf 3; | NULL | NULL | data 2 ≤ 200 | data 2 > 200 |
| 3-2 | NULL | | | NULL | NULL |
| 3-3 | NULL | | | NULL | NULL |
| 3-4 | NULL | | | | |
| 1-4 | NULL | NULL | NULL | NULL | NULL |

FIG. 38

| PATH | BLOCK NO. | | | | | | | | | | | |
|---|---|---|---|---|---|---|---|---|---|---|---|---|
| | 1-1 | 1-2 | 1-3 | 1-4 | 2-1 | 2-2 | 2-3 | 2-4 | 3-1 | 3-2 | 3-3 | 3-4 |
| 1 | 1 | 1 | 0 | 1 | 1 | 1 | 0 | 1 | 0 | 0 | 0 | 0 |
| 2 | 1 | 1 | 0 | 1 | 1 | 0 | 1 | 1 | 0 | 0 | 0 | 0 |
| 3 | 1 | 0 | 1 | 1 | 0 | 0 | 0 | 0 | 1 | 1 | 0 | 1 |
| 4 | 1 | 0 | 1 | 1 | 0 | 0 | 0 | 0 | 1 | 0 | 1 | 1 |

FIG.39

METHOD OF GENERATING DATA FOR EVALUATING PROGRAMS

BACKGROUND OF THE INVENTION

1. Field of the Invention

The present invention relates to a method of generating data for evaluating or testing a created program by an information processing system, and particularly to a method of generating data for evaluating source programs including a source program written in a high-level language.

2. Description of the Related Art

When it is desired to develop programs employed in an information processing system, processes are successively executed which comprise a request analyzing process of analyzing a user's request, a basic planning process of designing both a policy and an outline of each program, an outside planning process of fixing specifications of an available resource, external environments, etc., a detail planning process of determining a program processing procedure, a coding process of generating source programs based on detailed designs by a plurality of ordinary programmers, a program integrating process of combining the coded individual source programs while being tested, and a process of executing individual function evaluation tests about outer specifications and a total evaluating test to be performed as a system. After completion of these processes, the intended programs can be completed. During the above processes, testing and debugging are often repeated, principally after the coding process, to facilitate the work, using an information processing system. According to the test results changes in design are often made back to the processes before the detail planning process.

Taking into consideration the programs employed in the information processing system, the number of the programs for controlling the operation of the system increases with the enlargement and complication of the system. Further, the individual programs created by many programmers lead to complicated programs having frequent use of subroutines, modules, etc. Therefore, a lot of labor and much time are required to create test data or evaluation data for the programs. Thus, various proposals have heretofore been disclosed as such data generating methods.

FIG. 2 is a general block diagram showing a method of evaluating a conventional program using a program and test data for controlling the operation of an information processing system. In order to evaluate whether the created object program is operating normally, primary test data is first generated based on program specifications and the generated test data is stored in a memory device. Next, the test data and the program are loaded into the information processing system to thereby evaluate the loaded program. An evaluation of the program is displayed on a printer or a display as the result of evaluation and stored in the memory device each time the evaluation is performed.

When the program is first evaluated or tested based on the primary test data, evaluation or test items and portions and the like are left out or omitted. Thus, since the above evaluation results are not sufficiently satisfactory, a process of examining test conditions for the omitted test portions, adding test data to the above test data, modifying the program and performing the evaluation of the processed program again are frequently executed many times.

A test coverage disclosed in Japanese Patent Application Laid-Open Publication No. 1-100642, for example, is known as a method for detecting the evaluation or test omission. The test coverage shows the distinction between evaluated and non-evaluated portions of test object programs or the degree of achievement of evaluation, which is the proportion of a test completed portion to all the test object programs.

FIGS. 3 and 4 respectively show the result of measurement of coverage of source programs written in C languages and a call graph. (X) marks applied onto leading end portions of respective program lines in FIG. 3 show the result of passage of test data through the respective programs upon execution of the evaluation or testing. In order to call a seventh function (tonumber) in the call graph shown in FIG. 4, it is necessary to successively call respective functions so as to reach the intended function (tonumber) like a second function (yyparse) is called at the first function (main), the next function (yylex) is called at the second function (yyparse), . . . In order to execute an operation (n=c−'A'+10;) specified by an eighth program in FIG. 3, an argument (char c) passed to the function (tonumber) in accordance with the instructions of the first to seventh programs must be capital letters of the alphabet other than a hexadecimal number. The detection of a condition for calling these functions and a condition for passing through portions in the functions has heretofore been performed by humans.

As described above, the conventional method using the test coverage is confined to the display of the passed portions in the source programs, in which the evaluation or testing has been executed. Further, the condition for passing through the non-tested portion had to be manually detected by a test data implementor. Therefore, the above method is accompanied by drawbacks that experience and much time and labor are required to create test data and careless mistakes are apt to be made.

To reduce the manual work, the following various systems have been disclosed.

FIG. 5 is a view for describing a processing system disclosed in Japanese Patent Application Laid-Open Publication No. 4-111024. This type of system has been designed for the purpose of automatically displaying branch conditions with respect to paths which do not pass through non-tested portions in order to efficiently perform a logical test of a microprogram. Information about addresses, branch conditions and branch addresses in the microprogram is stored in a branch information or data file through a branch data table in a source code file of the microprogram in accordance with a branch data generating process. Next, a branch pass information file for storing therein information about microprogram paths, and pass presence/absence flag and branch conditions are generated based on these branch data. The information about the pass presence/absence flag is obtained by setting the flag to the corresponding passed point in accordance with a branch pass information updating process upon execution of the program evaluation. The test data creator or implementor takes out and discusses information stored in the branch pass information file through an output device, improves test programs and data and repeatedly executes a program evaluation.

FIG. 6 is a view for describing a test item automatic generating system disclosed in Japanese Patent Application Laid-Open Publication No. 4-271440. This type of system is of one designed for the purpose of automatically generating test items used for the verification or testing of a microprogram. A branch information or data file corresponding to a file of path identification names and branch conditions is generated from a branch data table in a code file of the microprogram corresponding to a source. Next, a test item file is created based on branch data stored in the branch data file, and overlapping paths and logically impossible paths are eliminated, thereby creating and outputting an effective test item file.

FIG. 7 is a view for describing a systematic structure of an apparatus for automatically generating test data, which has been disclosed in Japanese Patent Application Laid-Open Publication No. 4-260941. An object of this type of system is to automatically generate test data whose coverage degree is 100%. The system has a branch information extracting means for extracting a test object program or all the branch instructions and branch condition data in a logic circuit and a reversibly tracing means for reversely tracing all the paths from the start to the end of a program or from the input to the output of the logic circuit in the direction going from an end instruction to a start instruction or an output terminal to an input terminal to thereby generate test data which successively pass through the paths.

FIG. 8 is a view for describing a systematic structure of a system for automatically generating test environments, which has been disclosed in Japanese Patent Application Laid-Open Publication No. 3-271949. An object of this type of system is to generate test data including all the test conditions. The system comprises a means for inputting a source program, a branch information storing means for storing branch conditions for the source program therein and generating input data and work data, a file analyzing means for analyzing a file accessing method used by the source program to thereby generate file information and a test environment generating means for generating test environments necessary for the source program.

However, each of the first and second prior arts shows the case where the microprogram is taken as the object. The first and second prior arts are applied only to the case where information about the flow of the program such as the branch data file has already been stored in the microprogram table. On the other hand, when the source program is written in a language other than the microprogram, for example, when the source program is written in a high-level language such as a C language including rows other than instructions for controlling the operation of a computer, information about the flow of the program is not necessarily known. Thus, a drawback arises in that when the flow of the program is unknown, these prior arts cannot be applied as they are unless the information about the flow of the source program is generated in advance before the generation of the test or evaluation data.

The systems according to the third and fourth prior arts have drawbacks that it is necessary to effect a branch condition analyzing process or the like on all the rows of the source program corresponding to an object to be evaluated or tested or a program of execute form in order to prevent the test items and data from being omitted and a problem arises in the inputting and processing of variables described in a branch conditional expression. Further, the systems involve problems in that the amount of generated test data and test executing time greatly increase when all the paths are checked without omission, so that an evaluation system resource occasionally exceeds an allowable limit.

SUMMARY OF THE INVENTION

An object of the present invention is to provide a method of generating data for evaluating a program, which is capable of solving the above drawbacks and generating path information corresponding to the flow of the test object program so that efficient test data is easily generated.

As a means for achieving the above object, there is provided a method of generating data for evaluating a source program, comprising a program dividing process of reading the source program, detecting a branch instruction and a label, dividing the source program into program blocks at every series of program groups and generating basic block data at every program block, a branch data generating process of generating branch data between the program blocks, for shifting from one program block to another program block and storing the generated branch data, and an arrival data generating process of generating data for causing the generated branch data to continuously reach from the beginning of the source program to the individual program blocks and outputting the generated data.

As another means to achieve the object of this invention, a method of generating data for evaluating a source program is provided, comprising a program dividing process of reading the source program, detecting a branch instruction and a label, dividing the source program into program blocks at every series of program groups and generating basic block data at every program block, a variable data generating process of generating variable data for substituting and referring to a variable in the source program and storing the generated variable data, a branch data generating process of generating branch data between the program blocks, for shifting from one program block to another program block and storing the generated branch data, a path data generating process of generating path data for each program processing flow based on the generated branch data, and a test data generating process of generating test data from the path data and the variable data.

Preferably, the above method includes a path data selecting process of eliminating data about redundant paths in the path data and selecting an essential path and a test data generating process of generating test data from the path data selected by the path data selecting process and the variable data.

Further, the source program may be written in a high-level language including a comment statement used for the generation and maintenance of the program.

Furthermore, each of the program blocks may include at least one basic block divided by one branch instruction or a label and at least one compound block comprised of two or more basic blocks.

According to the first means for achieving the object of the invention, the arrival data, which reaches from the beginning of the program to a desired program block, can be generated and outputted by executing the aforementioned procedure employed in the present invention.

According to the second means for achieving the object of the invention, the path data indicating the processing path of each program block can be generated so as to produce the test data.

Further, the test data can also be generated by eliminating the redundant paths and selecting the essential test path.

Accordingly, the present invention can bring about an advantageous effect that the data for evaluating the source program without omission can be easily generated.

The above and other objects, features and advantages of the present invention will become apparent from the following description referring to the accompanying drawings which illustrate examples of preferred embodiments of the present invention.

BRIEF DESCRIPTION OF THE DRAWINGS

FIGS. 10(A) through 10(C) respectively illustrate structures of respective data files, wherein FIG. 10(A) is a view for describing the structure of a basic block file 120, FIG. 10(B) is a view for describing the structure of a branch data file 140 and FIG. 10(C) is a view for describing the structure of an arrival data file 160;

FIG. 15 is a view for explaining one example of a test objective source program employed in a second embodiment;

FIGS. 16(a) through 16(d) are views for describing the manner in which a flag renewal file has been updated;

FIGS. 17(a) through 17(b) are views for describing a basic block file 120 employed in the second embodiment;

FIGS. 18(a) through 18(c) are views for describing the process of creating the branch data file 140;

FIG. 19 is a view for describing a branch data file 140 employed in the second embodiment;

FIGS. 20A-20C are views for describing the process of creating the arrival data file 160;

FIG. 21 is a view for describing an arrival condition file 160 employed in the second embodiment;

FIGS. 22(A) and 22(B) are respectively views illustrating a list indicative of a principal part of a test objective C-language source program employed in a third embodiment and a part of an assembly list of the C-language source program;

FIG. 24 is a view for describing a basic block file employed in the third embodiment;

FIG. 25 is a view illustrating one example of a branch data file employed in the third embodiment;

FIG. 26 is a view illustrating one example of an arrival data file employed in the third embodiment;

FIG. 28 is a view illustrating one example of an arrival condition list of basic blocks 3–5, which is employed in the third embodiment;

FIG. 31 is a view for describing a structure of path data file 165;

FIGS. 35(A) through 35(C) are respectively views for describing the process of generating the test path selection table 180A;

FIG. 36 is a view for describing a list of a source program employed in a sixth embodiment;

FIGS. 37(A) through 37(C) are respectively views for describing branch data produced from the source program employed in the sixth embodiment;

FIG. 38 is a view for describing a path data list employed in the sixth embodiment;

FIG. 39 is a view illustrating the relationship between respective paths and basic blocks in the form of a path chart of a path selection table.

DETAILED DESCRIPTION OF THE PREFERRED EMBODIMENTS

Figure 1:
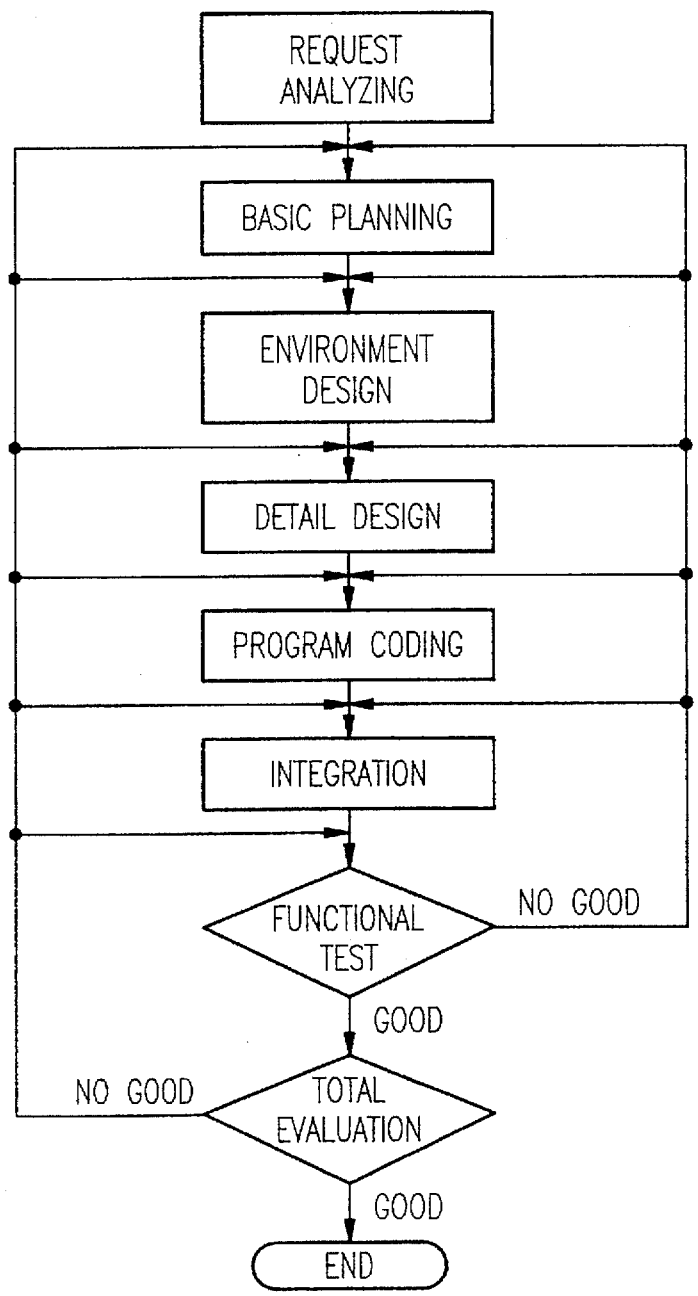
FIG. 1 is a view for describing processes of developing programs by an information processing system.
Figure 2:
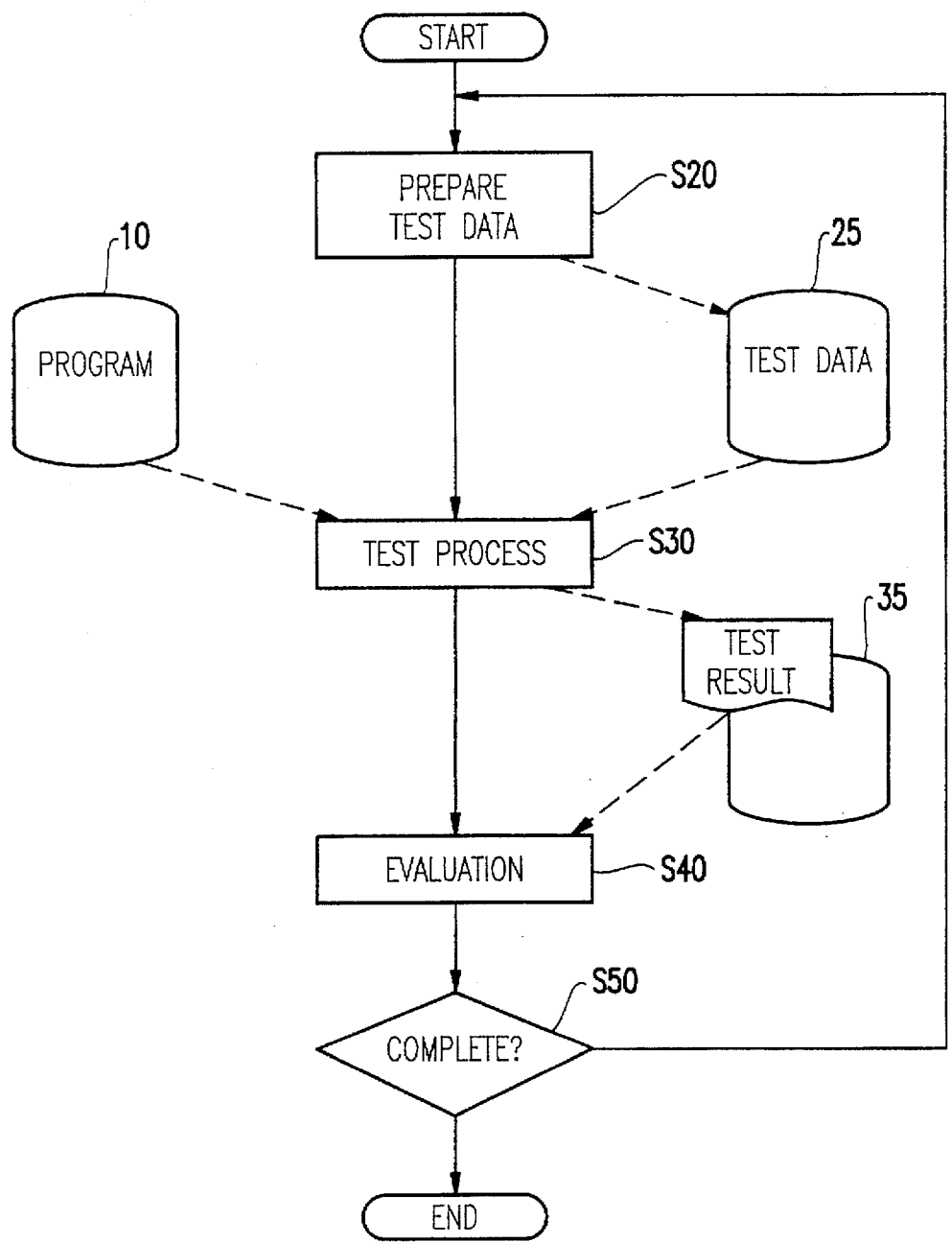
FIGS. 2 through 8 are respectively block diagrams showing one example of a conventional method of creating test data.
Figures 3, 4:
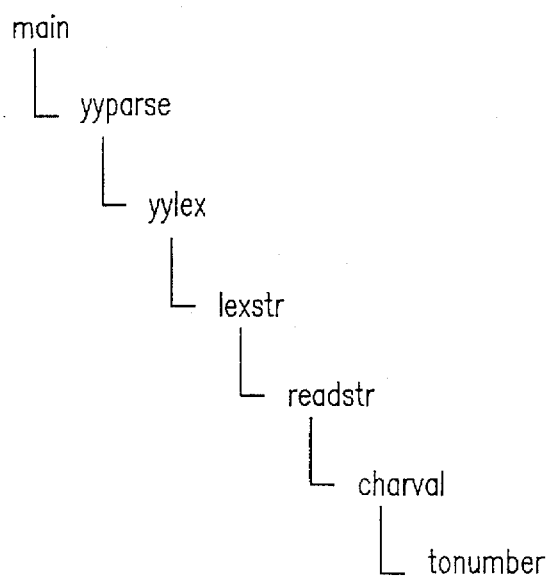
Figure 5:
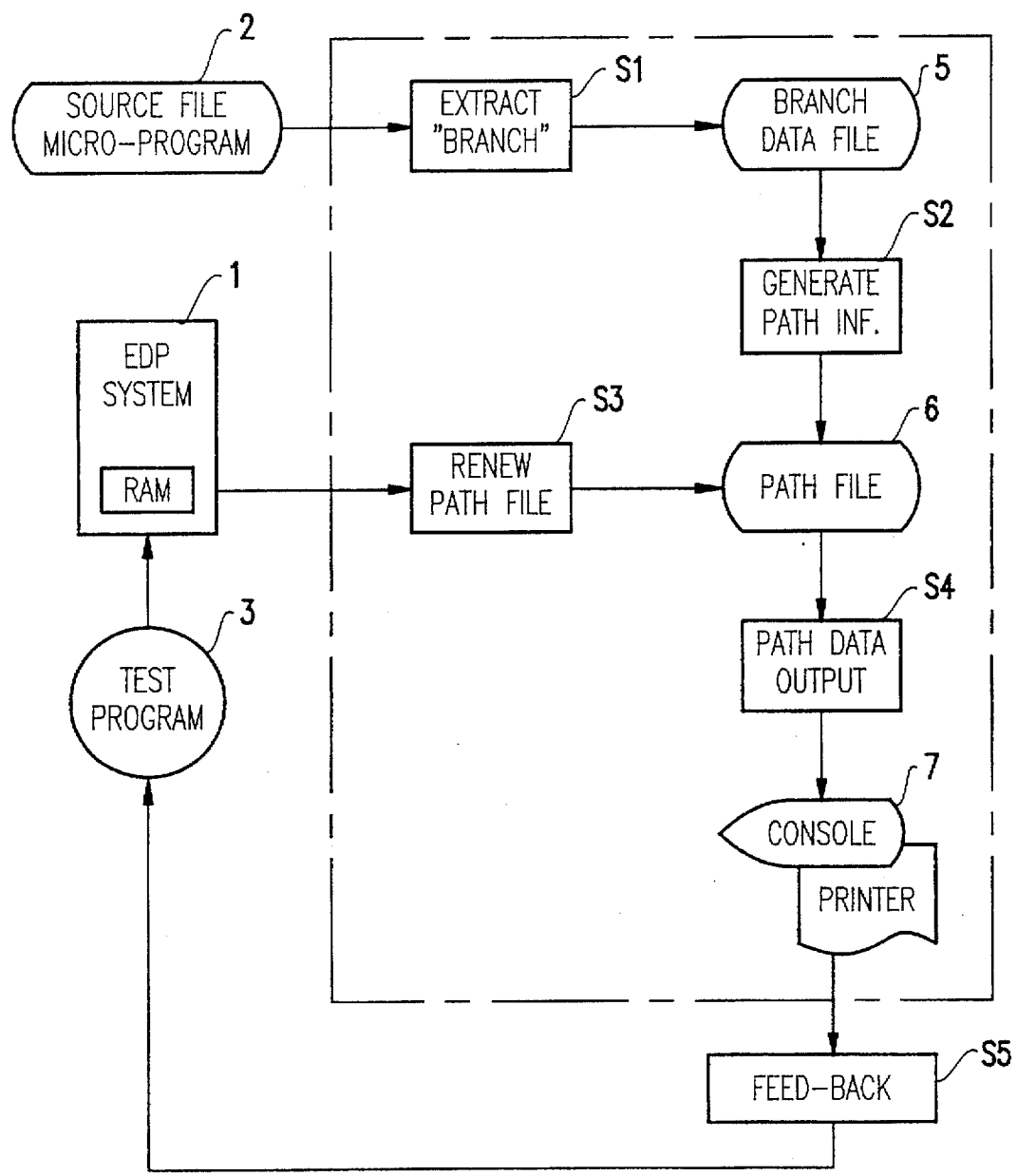
Figure 6:
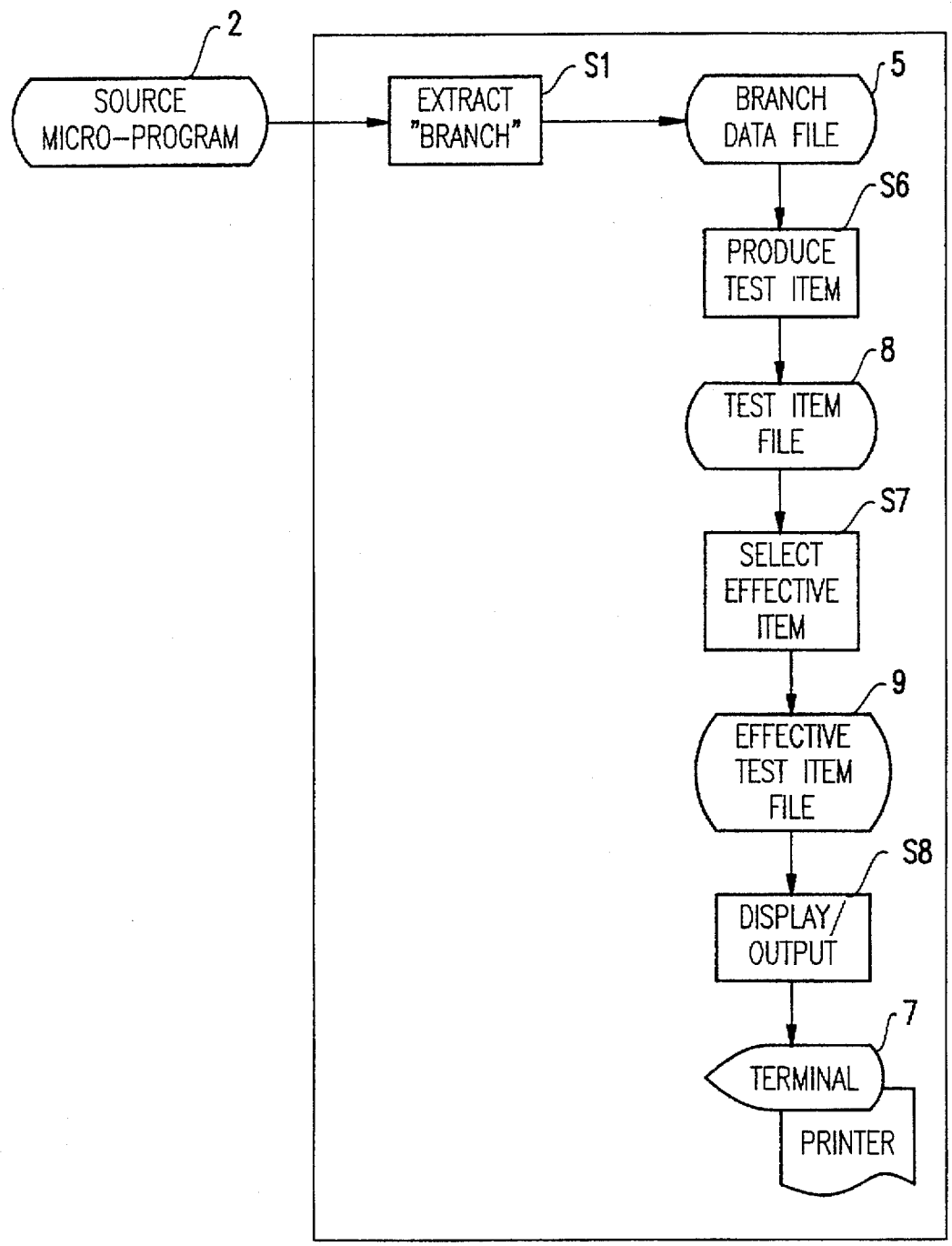
Figure 7:
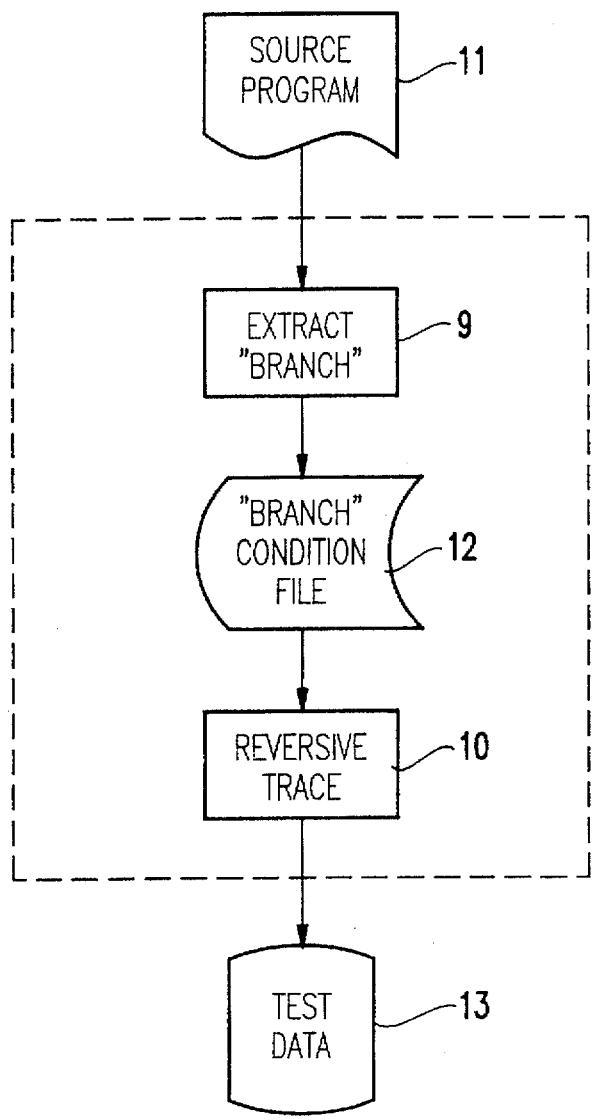
Figure 8:
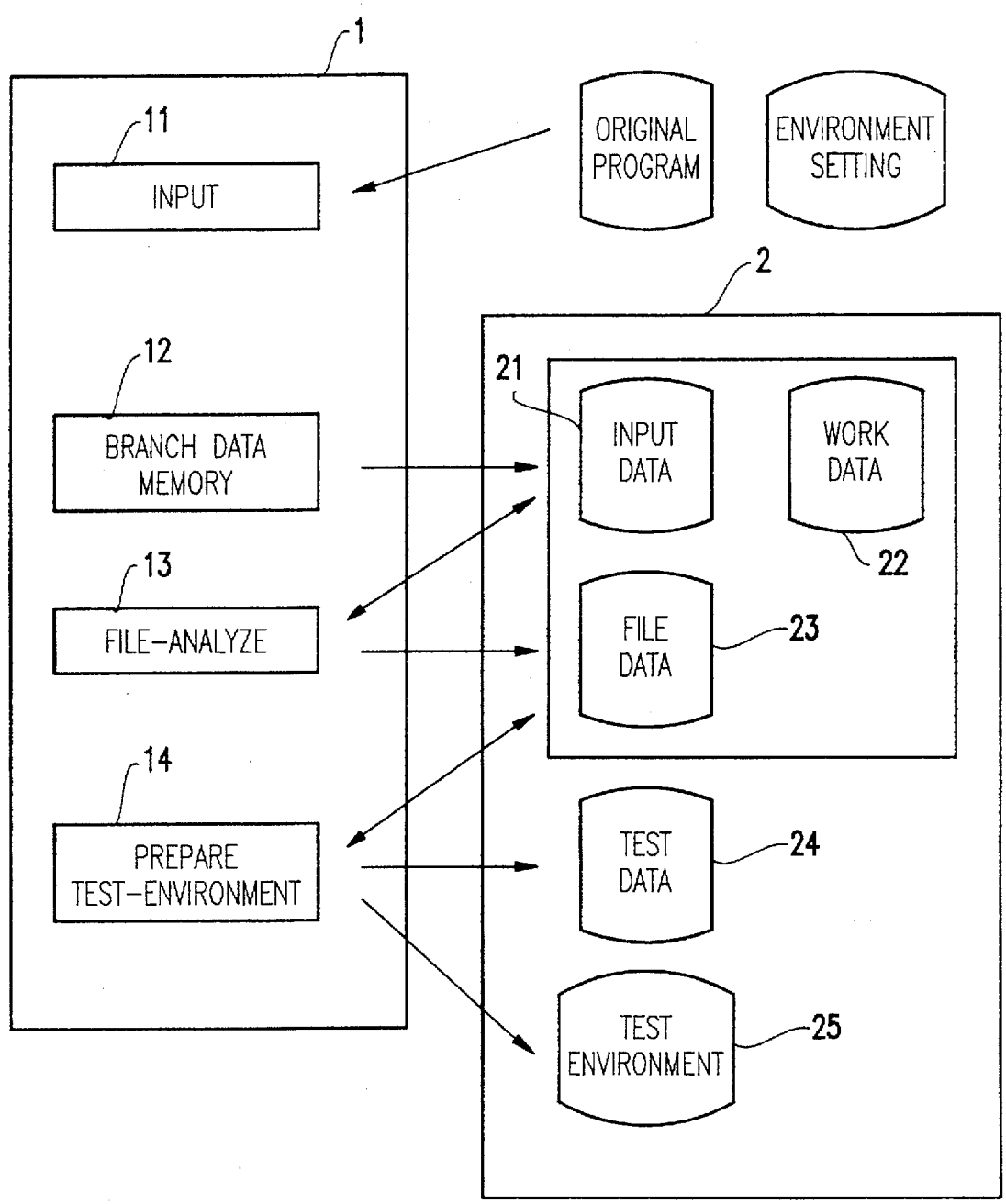
Figure 9:
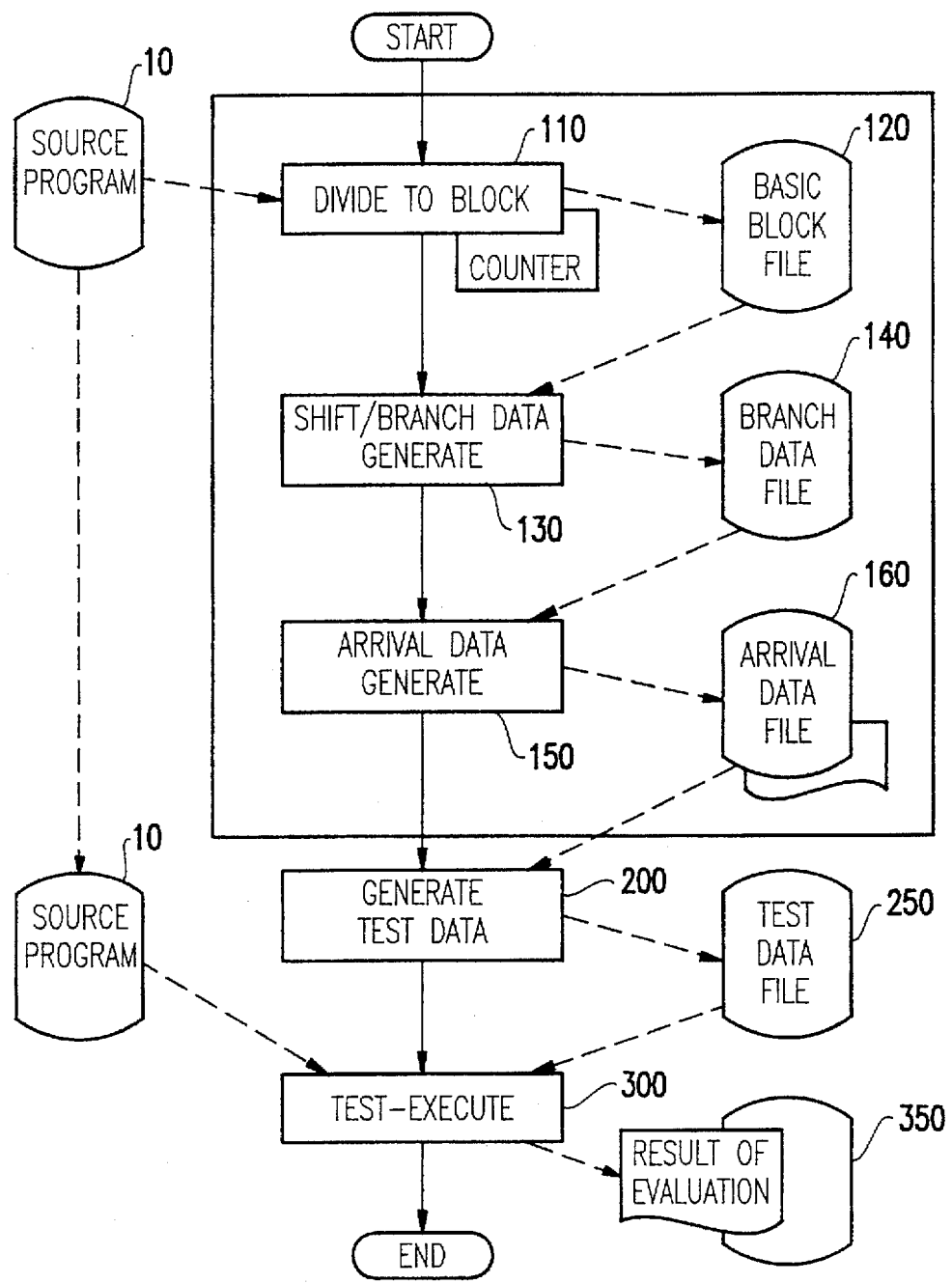
FIG. 9 is a block diagram showing the structure of a first embodiment.

As shown in FIG. 9, a basic procedure employed in the first embodiment comprises a basic block dividing procedure section 110, a shift/branch data generating procedure section 130 and a block arrival data generating procedure section 150.

The basic block dividing procedure section 110 corresponds to a program dividing process. In the basic block dividing procedure section 110, a source program 10 is read and divided into basic blocks corresponding to a series of program groups in accordance with a label name or branch instruction of the source program 10. Block numbers, block start and last line numbers, label names, branch instructions, block numbers and label names of a shift or branch address, shift or branch conditions of the branch address, flag set instructions, etc., all of which are set so as to correspond to respective basic blocks, are stored in a basic block file 120 as basic block information or data.

As shown in FIG. 10(A), the basic block file 120 comprises block numbers 121, start lines 122 and last lines 123, which are generated and provided each time the source program 10 is divided into the individual basic blocks, head labels 124, shift or branch instructions or control statements 125, a shift or branch address 126, branch information or data 127 and the like, which are extracted from the read source program. Further, the column for the branch address 126 is divided into respective columns for a block number 126a and a label name 126b. The column for the branch data 127 is divided into respective columns for a flag set instruction 127a, a first operand 127b and a second operand 127c.

The shift/branch data generating procedure section 130 corresponds to a branch data generating process. The branch data generating procedure section 130 generates a branch data file 140 comprised of block numbers n of the individual basic blocks, block numbers m of basic blocks which have passed immediately before the basic blocks of the block numbers n, and shift or branch conditions for shifting from mth basic blocks of the block numbers m to the nth basic blocks from data in the basic block file 120.

As shown in FIG. 10(B), the branch data file 140 comprises a column for a block number 141, a column for a proceeding block number 142 which corresponds to the number of a basic block immediately before being shifted to a basic block of the block number 141, and a column for a branch condition 143 which corresponds to a condition for making a shift from the basic block of the proceeding block number to the basic block of the block number. The flow of the program is as follows. Namely, since the program continuously shifts from basic block one to a basic block that will arrive immediately after the basic block one unless the program is specified by the branch instruction or the like, the block number m entered in the column for the proceeding block number 142 normally includes only one basic block of an n-1th block number with respect to one block number n entered in the column for the block number 141 but often includes one or more basic blocks of block numbers other than the n-1th block number when the basic block is shifted even from other basic blocks in accordance with the branch instruction.

The block arrival data generating procedure section 150 corresponds to an arrival data generating process. The block arrival data generating procedure section 150 produces block arrival data indicating of conditions for reaching the respective basic blocks from data stored in the branch data file 140 and causes the block arrival data to be stored in a block arrival data file 160.

As shown in FIG. 10(C), the block arrival data file 160 comprises two columns, i.e., a column for a block number 161 and a column for an arrival condition 162.

An evaluation or test data generating procedure section 200 corresponds to a test data generating process and generates test data 250 based on the data stored in the block arrival data file 160. The test data 250 is used to evaluate the source program 10 by a test executing procedure section 300.

Detailed procedures of the respective sections will now be described below.

Figure 11:
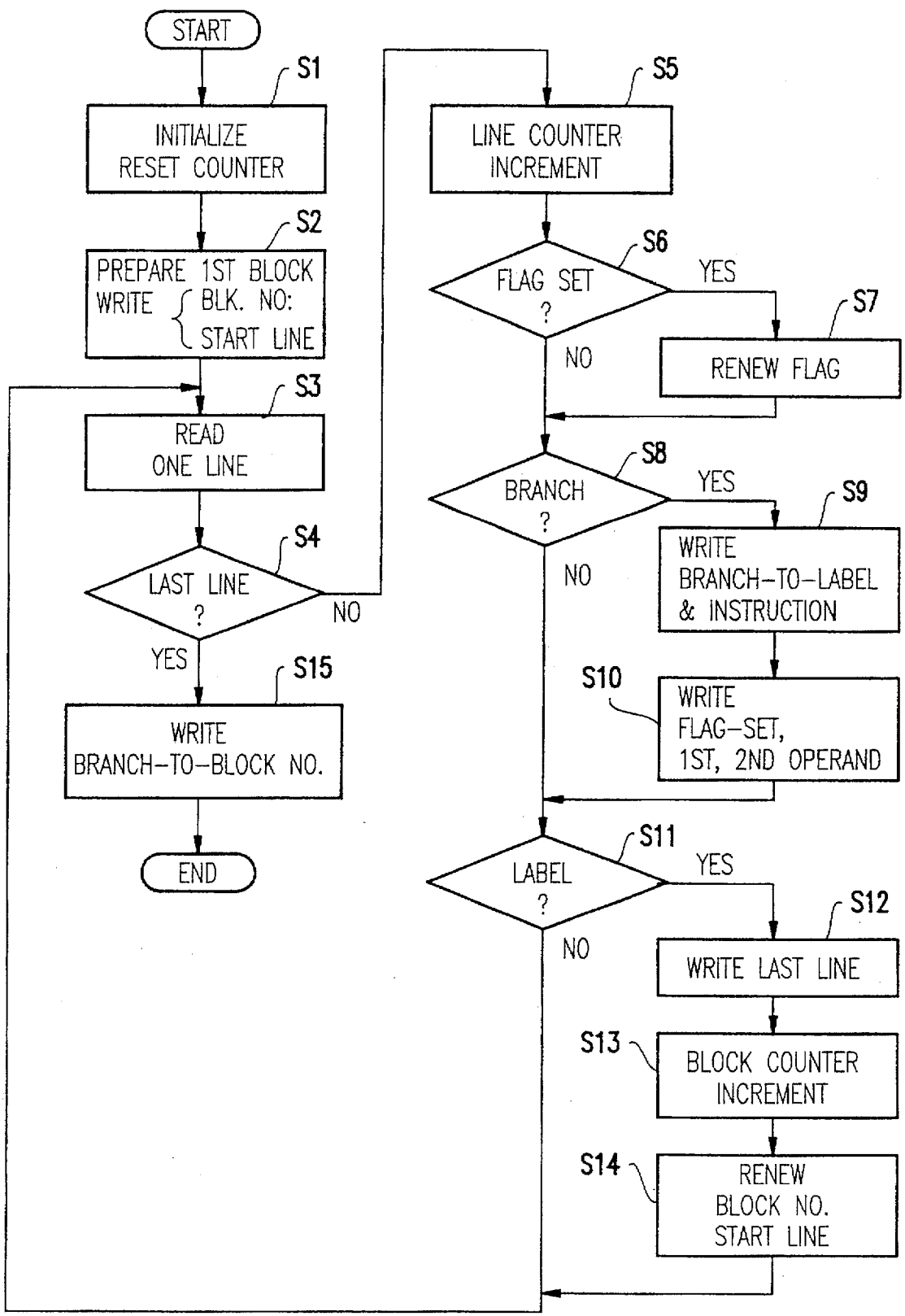
FIG. 11 is a flowchart for describing a sequential procedure of a basic block dividing procedure section 110.

The basic block dividing procedure section 110 performs processing using a line counter and a block number counter. Referring to a flowchart shown in FIG. 11, these counters are first placed in the initial state or "0" state (S1). Next, the counts of the counters are respectively written into the columns for the "start line 122" and "block number 121" of the basic block file 120 (S2). Thereafter, the source program 10 is read by one line (S3) and a decision is made as to whether the read one line corresponds to the last line (S4). If the answer is NO in S4, then the count of the line counter is incremented by "1" (S5). It is next determined whether or not an instruction with respect to the read one line is of a flag set instruction for varying a flags (S6). If the answer is NO in S6, it is then decided whether or not the above instruction is of a branch instruction (S8). If the answer is YES in S6, then flag information is updated before the decision made as to whether the above instruction is the branch instruction (S7). If it is determined in S8 that the above instruction is of the branch instruction, then a shift/branch instruction with respect to the read line and a label name of a branch address thereof are respectively written into the columns for the "branch instruction 125" and the "label name 126b of the branch address" (S9). On the other hand, when it is judged in S6 that the above instruction is of the flag set instruction, the flag set instruction and first and second operands are respectively written into the columns for the "flag set instruction 127a", the "first operand 127b" and the "second operand 127c" based on the updated flag information (S10). It is thereafter determined whether or not a label exists (S11). If it is determined in S11 that the label exists in the head of the read one line, then the label is written into the column for the "head label 124" and the count of the line counter is written into the column for the "last line 123" (S12). As a preparation to read the next line, the count of the block counter is incremented by "1" (S13) and the incremented value is written into the column for the "block number 121" for the next basic block. Further, the count of the line counter is also incremented by "1" and the incremented value is written into the column for the "start line 122" for the next basic block (S14). Thereafter, the routine procedure returns to the procedure in S3 where the next source program is read by one line. If the answer is NO in S11, then the routine procedure returns to the procedure in S3 without executing the last line write processing and the counter processing and the like in S12 through S14.

If the read one line of source program is found to be the last line in S4, then the label name of the branch address, which has been written into the column for the label name in S9, is converted into a block number for each of the basic blocks written into the basic block file 120. Thereafter, the value corresponding to the converted block number is written into the column for the "block number 126a in the branch address" at each basic block (S15).

Figure 12:
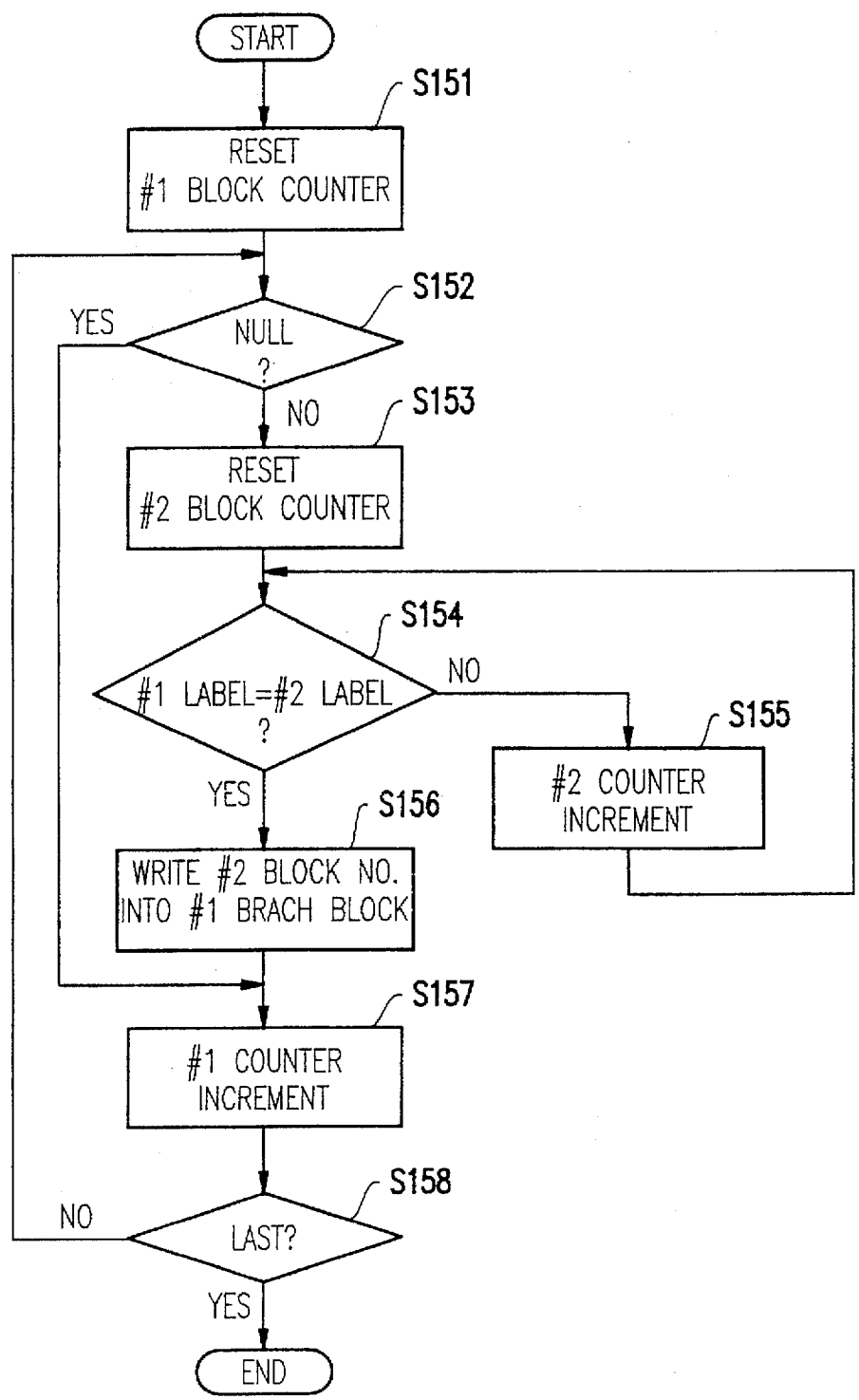
FIG. 12 is a flowchart for describing the generation of block numbers in a branch address.

FIG. 12 shows a detailed procedure of generating the block number of the branch address (S15). Namely, a value n entered in the column for the block number 121, which is intended for the determination of the block number of the branch address, is first set to a first block counter #1 as "1" (S151). Next, a check is made as to whether or not the column for the branch instruction 125 is of "NULL" (S152). If the answer is NO in S152, then a value n identical to the value set to the first block counter #1 is set to a second block counter #2 (S153). It is then determined whether or not a label name entered in the column for the label name 126b of the branch address of the block number n specified by the first block counter #1 is equal to a label name entered in the column for the head label 124 of the block number m (which is first equal to n or 1) (S154). If the answer is NO in S154, then a process of incrementing the second block counter one by one and making a check on the label name of the next basic block is repeated until the two label names are equal to each other (S155). If the answer is YES in S154, then a count m of the second block counter is entered in the column for the block number 126a of the branch address with respect to a basic block specified by the first block counter (S156).

Next, the branch data file 140 is created based on the basic block file 120 in accordance with the branch data generating procedure section 130.

Figure 13:
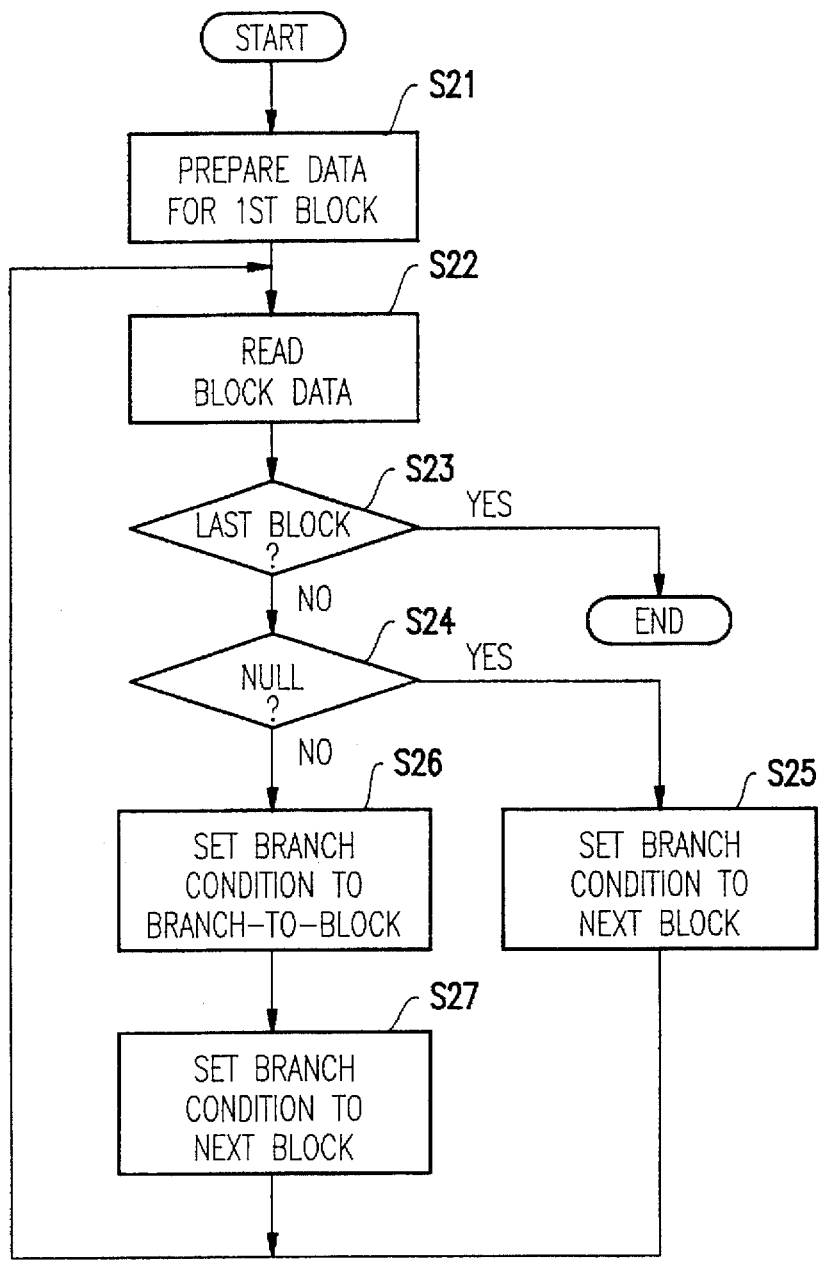
FIG. 13 is a flowchart for describing a sequential procedure of a branch data generating procedure section 130.

As shown in FIG. 13, the branch data generating procedure section 130 first starts data processing from a block number "1" which must always be passed through first, and processes basic blocks one by one in order of the block numbers so as to create branch data. At the time of the initial setup, "1", "START" defined as a function name of the first basic block, and "NULL" are first entered in the columns for the block number 141, the proceeding block number 142 and the branch condition 143 in the branch data file 140 respectively (S21).

Next, information or data about one block number n (initially equal to "1" in S21) indicated in the column for the block number 141 is read from the basic block file 120 (S22). If it is determined that the information does not correspond to the final basic block (S23), then a decision is made as to whether data entered in the column for the branch instruction 125 is "NULL" (S24).

If the answer is YES in S24, it is then decided that the block number n (initially equal to 1) proceeds to the next block number n+1 (initially equal to 2) without condition. Thus, the result of decision is entered in the corresponding columns in the following manner. Namely, a block number "n+1", which appears immediately after the shifting to the next line, is entered in the column for the block number 141 corresponding to the line next to the line of the entered block number n, "NULL" is entered in the column for the branch condition 143 and a block number "n" being in processing is entered in the column for the proceeding block number 142 (S25). Thereafter, the routine procedure returns to S22 where the next basic block data is read.

If the answer is NO in S24, then the read basic block is set as the block immediately before it passes through the branch condition of the block at the branch address. Namely, a block number "m" entered in the column for the block number 126a in the branch address with respect to the block number n (initially equal to 1) of the basic block file 120 is written into the column for the block number 141 of the branch data file 140. Further, a branch condition derived from the column for the branch instruction 125, the column for the flag set instruction 127 and the columns for the first and second operands is written into the column for the branch condition 143. Furthermore, a block number "n" being processed is written into the column for the proceeding block number 142 (S26).

If it is judged that the derived branch condition in S26 is not met, then the next block number "n+1" and a condition negative to the branch condition in S26 are respectively entered in the column for the block number 141 of the branch data file 140 as the block number to be shifted next and the column for the branch condition 143 in a manner similar to the case where the data entered in the column for the branch instruction 125 is found to be "NULL" (S27). Thereafter, the routine procedure returns to S22. Thus, the branch data file 140 is generated by repeating the above procedures of Steps S22 through S27 up to the final basic block.

Figure 14:
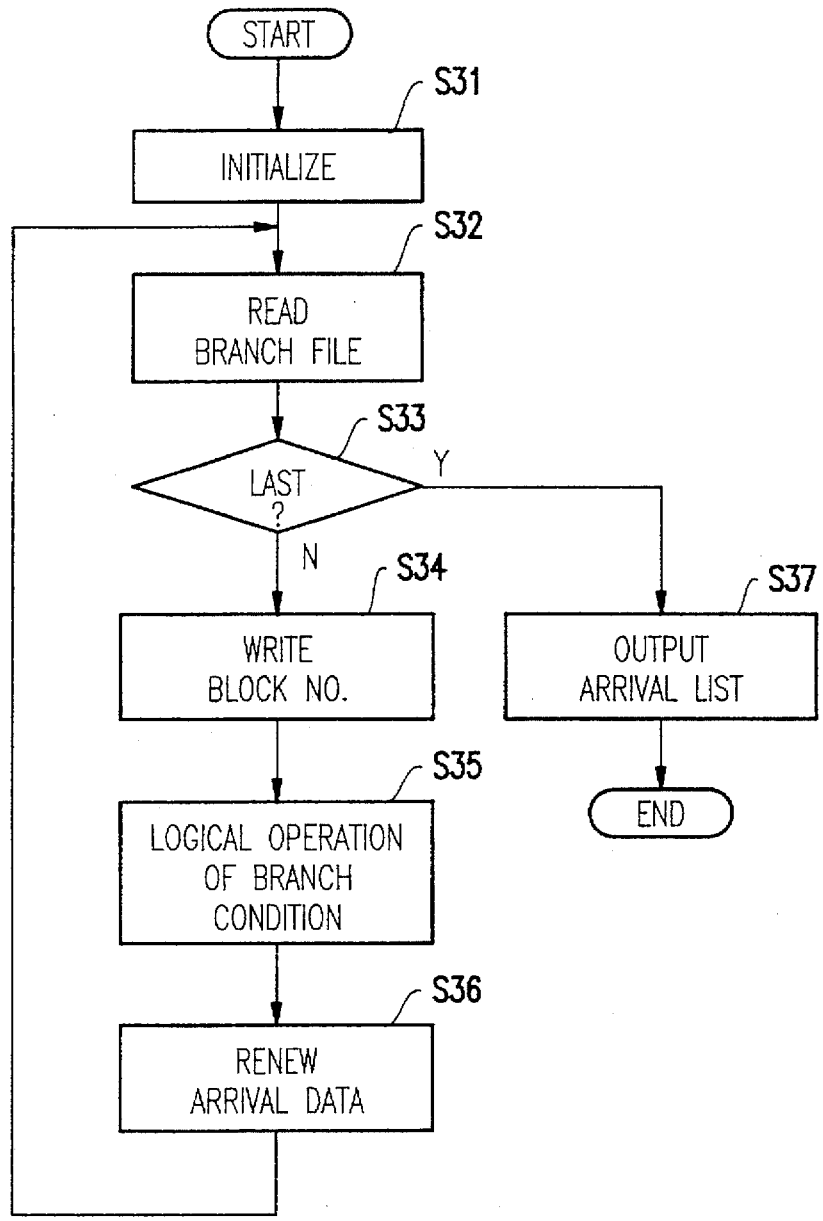
FIG. 14 is a flowchart for describing a sequential procedure of an arrival data generating procedure section 150.

A sequence of steps of the arrival data generating procedure section 150 for generating the arrival data file 160 will next be described with reference to FIG. 14.

The following process is first executed as the initial setup. Namely, the first data entered in the columns for the block number 141 and the branch condition 143 in the branch data file 140 are transferred from the branch data file 140 to write "1" and "NULL" into the first line of the column for the block number 161 in the arrival data file 160 and the first line of the column for the arrival condition 162 therein respectively (S31). Next, data about the next block number in the branch data file 140 is read (S32). It is further determined whether or not a basic block corresponding to the next block number corresponds to the final basic block (S33). If the answer is NO in S33, then a block number and a branch condition in the branch data file 140 are written into the columns for the block number 161 and the arrival condition 162 in the arrival data file 160 subsequently to the previous block number (S34). If the branch condition is found to be plural at this time, then the logical OR of the plurality of branch conditions is calculated (S35). Namely, when a plurality of branch conditions such as "A or B or C or ...", etc. exist and A and B are affirmative and negative under the same branch condition, either will be OK even if these branch conditions are present or absent. Therefore, A and B are erased and the arrival condition is set as "C or ...". If all the branch conditions are set in the form of a pair of A and B alone, then the column for the arrival condition 162 is renewed as "NULL" (S36).

Thus, the arrival data file 160 created by executing the sequence of steps up to the last basic block is outputted and displayed as an arrival condition list in desired form.

A modification of operation of the first embodiment, in which the source program 10 employed in the first embodiment is used as an assembler program shown in FIG. 15, will now be described specifically as a second embodiment.

A basic block file 120 is first generated in accordance with a sequence of steps of a basic block dividing procedure section 110. Namely, a line counter and a block counter are initialized to set "0" and "NULL" to a column for a block number 121 and a column for a head label 124 in the basic block file 120 respectively. First of all, the counts of these counter are written into the columns for the block number 121, start line 122 and head label name 124. Thereafter, the line counter is incremented one by one each time the source program 10 is read line by line. When a flag set instruction is detected, flag information is updated and held until a branch instruction such as a branch or the like or a label is detected. FIGS. 16(a) through (d) are respectively views showing one example of the process of renewing a flag renewal file in association with programs (a) through (d) in FIG. 15. When the branch instruction or label is detected, the count of the line counter is written into a column for a last line 123 in the basic block file 120. When the branch instruction is detected, the corresponding counts are written into their corresponding columns for a branch instruction 125, a label name 126b of a branch address, a flag set instruction 127a and first and second operands 127b and 127c. When the label is detected, the block counter is incremented by 1 and the next line is read after a block number and a start line with respect to the next basic block have been updated. The initial state of the so-created basic block file is shown in FIG. 17(A).

Further, the basic block dividing procedure section 110 writes block numbers in a branch address, which correspond to label names 126b of the branch address, into columns for block numbers 126a of the branch address by reference to data entered in the columns for the block number 121 and the head label name 124 shown in FIG. 17(A) to thereby complete a basic block file 120 as shown in FIG. 17(B).

A branch data file 140 is produced from the created basic block file 120 under the process of varying from FIG. 18(a) to FIG. 18(c) in accordance with the sequence of steps of the branch data generating procedure section 130. "1", a function name "START" defined as the initial function and "NULL" are first entered in the first line of a column for a block number 141, a column for a proceeding block number 142 and a column for a branch condition 143 respectively (FIG. 18(a)). It is next determined whether the branch instruction 125 corresponding to the first line of the basic block file 120 is "NULL". Since the branch instruction is not "NULL" but "JNE" in this case, "1", "FNAME[BX]=='R'" and "FNAME[BX]!='R'" are respectively set to the columns for the proceeding block 142, the branch condition 143 of the block 2 and the branch condition 143 of the block 3 with respect to two basic blocks of the next block or a block 2 in this case and a block 3. The result of setting is shown in FIG. 18(b). Since the column for the branch instruction of the block number 2 at the second line in the basic block file 120, which indicates the branch instruction of "NULL", is "NULL", "2" and "NULL" are respectively entered in the columns for the proceeding block number and the branch condition of the block 3 in the branch data file 140. The result of entering is shown in FIG. 18(c). The processing is hereafter performed up to the final block number 5 of the basic block file 120 in the same manner as described above. As a result, the completed branch data file 140 of the source program employed in the second embodiment is shown in FIG. 19.

The process of creating an arrival data file 160 from the branch data file 140 shown in FIG. 19 will now be described with reference to FIGS. 20A–20C.

Since a basic block of a block number 1 is one which is initially executed without condition, "NULL" is first entered in a column for an arrival condition 162. Since an arrival condition of the next block number 2 is one obtained by combining an arrival condition "NULL" of a proceeding block 1 and a branch condition "FNAME[BX]=='R'" of the branch data file 140, the arrival condition is obtained as "FNMAE[BX]=='R". Similarly, since an arrival condition of a block number 3 is one obtained by combining arrival conditions of proceeding blocks (two blocks comprised of the blocks 1 and 2 in this case) and a branch condition in the branch data file 140, the arrival condition of the block number 3 is also obtained as "FNAME[BX]=='R' or FNAME[BX]!='R'" as represented by "BEGINNING" in FIG. 20A. Since the arrival condition shows that "FNAME[BX]" is equal and unequal to R, "NULL" is eventually entered in the column for the arrival condition. Subsequent arrival conditions of block numbers are hereafter processed in the same manner as described above. As a result, a state in which a block 5 is in processing is represented by "MIDDLE" in FIG. 20B. Further, the final state is represented by "FINISH" in FIG. 20C.

FIG. 21 illustrates one example of an arrival condition list created by combining the basic block file 120 and the arrival data file 160. The arrival condition list is outputted from an output apparatus such as a printer or the like.

When it is desired to create evaluation or test data, it can be understood from the arrival condition list that basic blocks of block numbers 1, 3 and 5 pass irrespective of the test data and needs test data represented as "FNAME[BX]=='R'" to pass through a block number 2 and test data represented as "FNAME[BX]=='W'" to pass through a block number 4. Thus, in the present embodiment, all the paths of the objective assembler source program can be evaluated by creating the test data represented as "FNAME[BX]=='R'" and "FNAME[BX]=='W'".

An embodiment in which the source program is written in a C language will next be described as a third embodiment. Since a function comprised of one basic block or a function comprised of a plurality basic blocks, i.e., a compound block forms the foundation of a processing unit, the C language needs a condition for attaining a specific function and a condition for attaining a specific basic block within the specific function. The assembler program converted from the source program written in the C language includes information about the compiler's line numbers and a comment sentence or statement in which a description of a source program sentence written in the C language is used as a comment. FIG. 22(A) shows one example of the source program written in the C language. FIG. 22(B) illustrates a part of the assembler program converted from the source program.

A description will now be made of a process of outputting arrival information from the assembler program in accordance with the procedure employed in the present invention. A sequence of steps of a basic block dividing procedure section employed in the present embodiment are represented as flowcharts shown in FIGS. 23(A) and 23(B) and are basically identical to those of the basic block dividing procedure sections 110 employed in the first and second embodiments. However, the basic block dividing procedure section further includes processing of a function related to a C source statement.

As shown in FIG. 24, a basic block file 120 employed in the present embodiment comprises a file which includes respective columns for a block number 121 through a label name 126b of a basic block and is identical to that employed in the second embodiment, and a file added with respective columns for a function name 128, a function name 129a of a calling function called by the block number and a block number 129b.

Figure 23A:
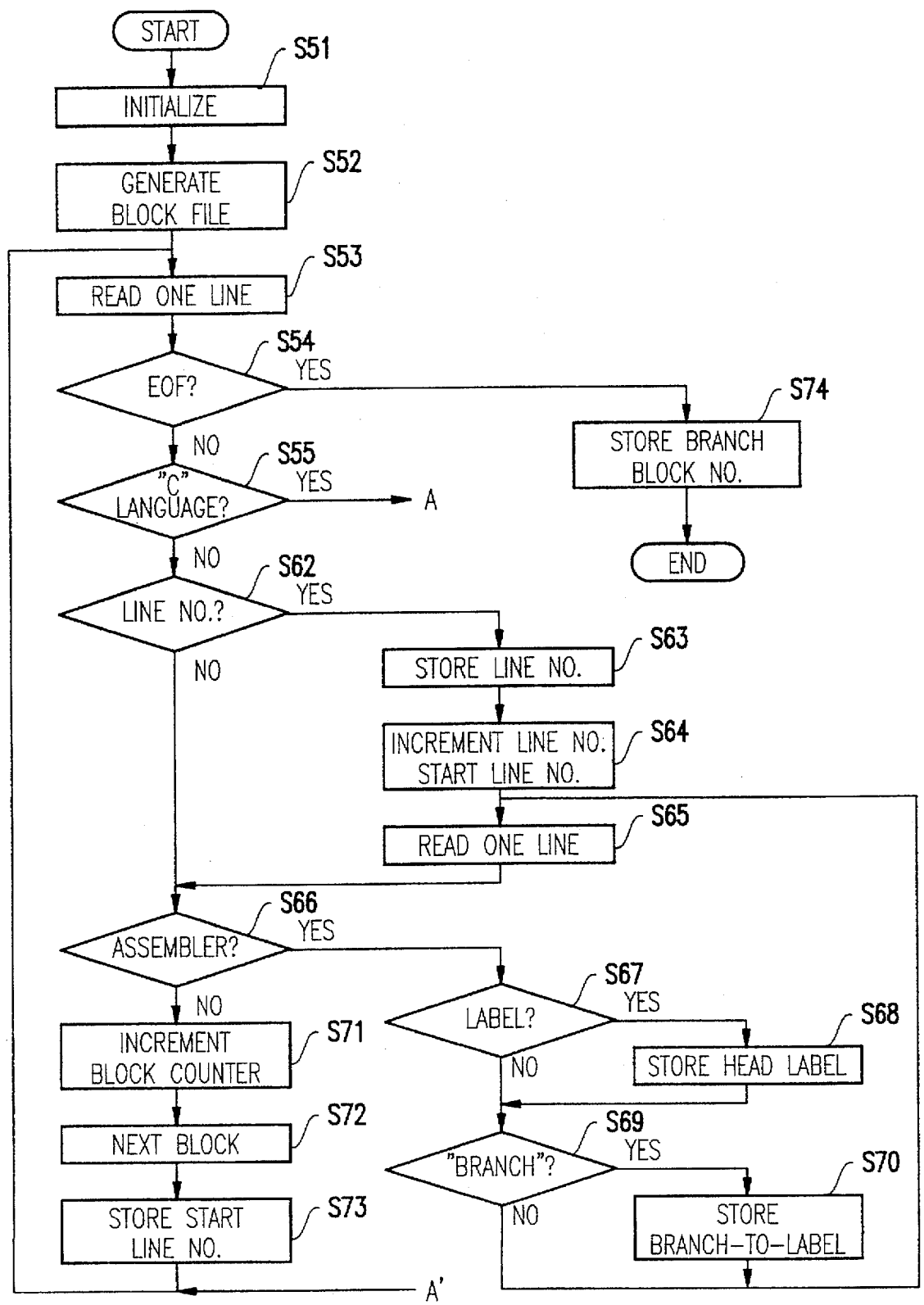
FIGS. 23(A) and 23(B) are respectively flowcharts for describing the generation of an arrival data file 160 employed in the third embodiment.
Figure 23B:
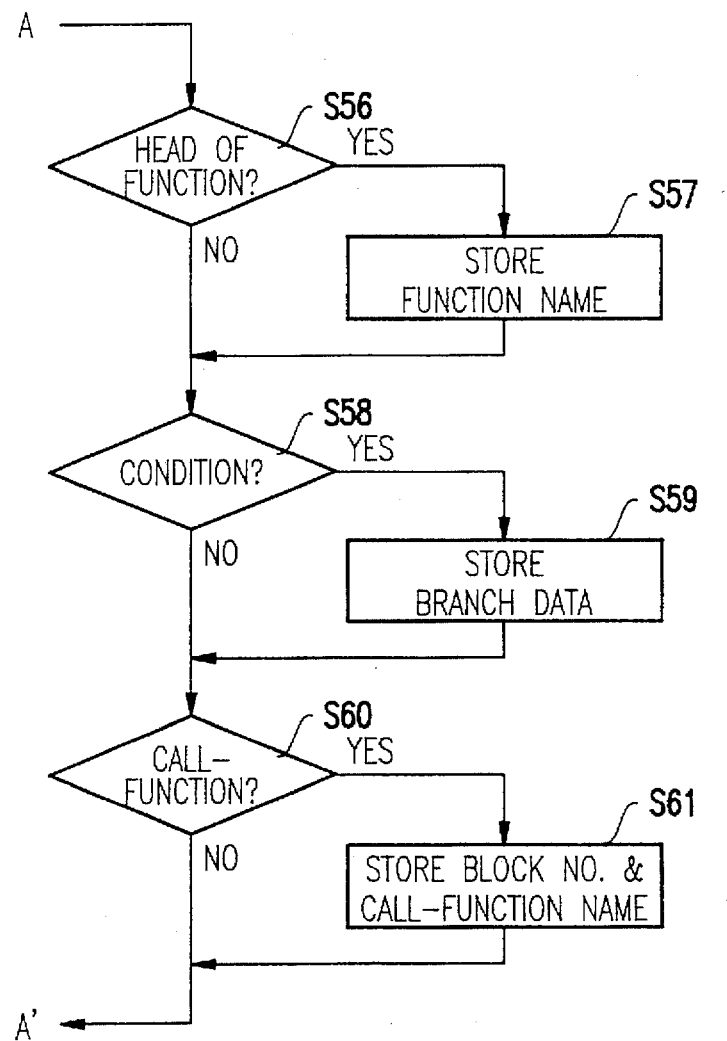

In FIGS. 23(A) and 23(B), a counter is initialized and a block number and a start line in the first basic block information or data are written into the basic block file 120. Thereafter, a source program is read from the head (S51 through S54).

If it is determined that the source program is a C language after being read from the head (S55), then the function names are detected. Function names obtained by each detection are entered in the columns for the function names 128 (S56 and S57). Each time a condition statement is detected, the detected condition statement is entered in the column for each of a control statement 125 and a branch condition 127 (S58 and S59). Each time a function calling statement is detected, a function name of a function called based on the function calling statement and a block number are entered in the columns for the calling function name 129a and the block number 129b (S60 and S61). Thereafter, the routine procedure returns to S53 where the next line is read. When the source program is of an assembler source program, the last line is represented as a line number at each block. Therefore, if the read line is of information about a line number, then the line number is entered in a column for a last line 123 and a line number obtained by adding 1 to the line number is held as the next start line 122 (S62 through S64).

When the read line corresponds to the assembler program, subsequent lines are read line by line until a label or a branch statement such as a branch or the like is detected (S65 and S66). When the label is detected, the detected label is entered in a column for a head label name 124 of the branch address and when the branch statement is detected, it is entered in the column for the label name 126b of a branch address (S67 through S70). Next, the block counter is incremented by 1 and information about the next basic block, i.e., a block number 121 and a start line 122 are created (S71 through S73). Thereafter, the routine procedure returns to S53 where the next line is read.

The contents of the basic block file produced by repeating the above processing are shown in FIG. 24.

A sequence of steps of a branch data generating procedure section 130 for creating a branch data file 140 are substantially identical to those of the branch data generating procedure sections 130 employed in the first and second embodiments but is different from the previous embodiments in which the branch condition has been determined from the flag set instruction, the branch instruction and the conditional expression in that the branch condition is determined from a control statement and a conditional expression. In the third embodiment, the control statement is "IF" and the conditional expression is "di-si<0" when the block number is taken as (3-3), for example. Therefore, the block is shifted to a block (3-10) of a head label "$SCS21115" when the conditional expression is represented as "di-si<0". When the conditional expression is represented as "di-si>=0", the block is shifted to a block (3-4), which appears immediately after the block number (3-10). Now, consider that the block number is (3-8) in which the branch instruction is "DO WHILE" and the branch condition is "strcmpi (keycode, scode[dx]!=0". In this case, the block is shifted to a block (3-2) of a head label "$D111" when "strcmpi (keycode, scode[dx])!=0". Further, when "strcmpi (keycode, scode[dx])==0", the block is shifted to a block (3-9) which appears immediately after the block number (3-2). The contents of the final branch data file 140 created in this way are shown in FIG. 25.

Similarly to the aforementioned embodiments, an arrival data file 160 shown in FIG. 26 is created from the branch data file 140 in accordance with an arrival data generating procedure section 150.

Figure 27:
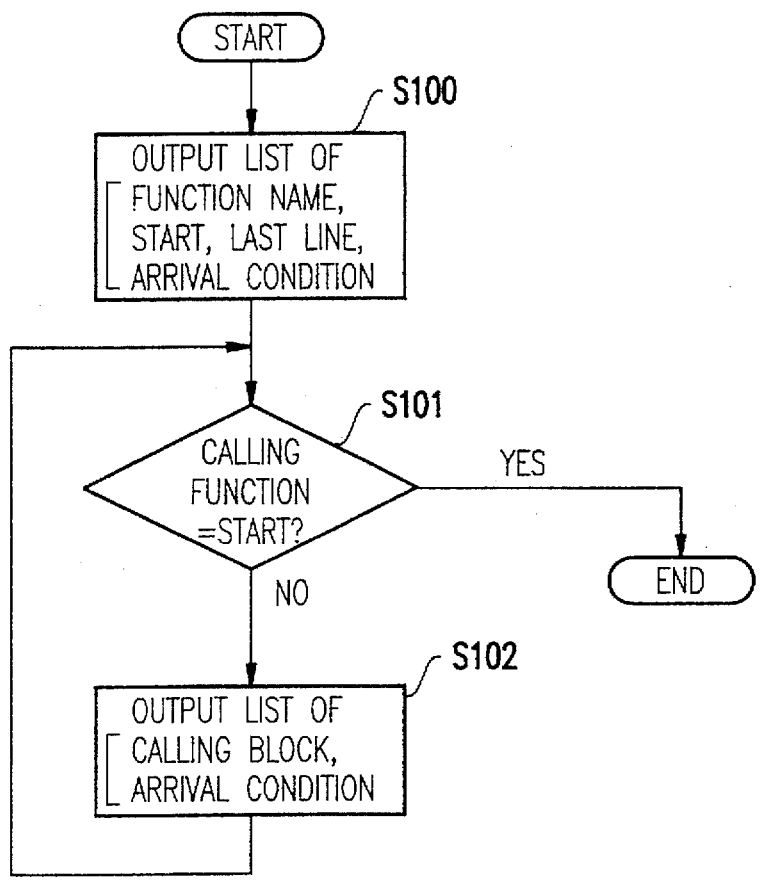
FIG. 27 is a flowchart for describing the outputting of an arrival condition list of specific blocks and functions, which is employed in the third embodiment.

Further, a procedure for outputting an arrival condition of a specific function and an arrival condition of a specific block from the arrival data file 160 will be described with reference to FIG. 27. A required specific block is first retrieved from the arrival data file 160 to thereby output a list of a function name 163, start and last lines 166 and 167 of the block and an arrival condition 162 (S100). Next, the calling block number 129b is retrieved until the calling function name 129a of the basic block file 120 becomes "START" (S101). Thereafter, a list of a function name of a function corresponding to the retrieved block number 129b, a function name of a function called by the above block number and an arrival condition is outputted (S102). FIG. 28 illustrates an arrival condition list of a block number 3-5 as an illustrative example.

When it is desired to create evaluation or test data for the source program, test data, which passes through the block of the block number 3-5, for example, may be created by reference to the arrival condition list in such a manner that an arrival condition of "selno==1" is met in the case of a function "main", an arrival condition of "csno==2" is met in the case of a function "searches", and arrival conditions of "di-si>=0" and "strcmpi (keycode, scode[dx])>=0" are satisfied in the case of a function "search21".

A description will next be made of a fourth embodiment which includes a branch data generating procedure section having a procedure of creating variable information or data about substitution of a calling variable and reference to the calling variable, and a path selecting procedure section for efficiently selecting a path used to create evaluation or test data.

Figure 29:
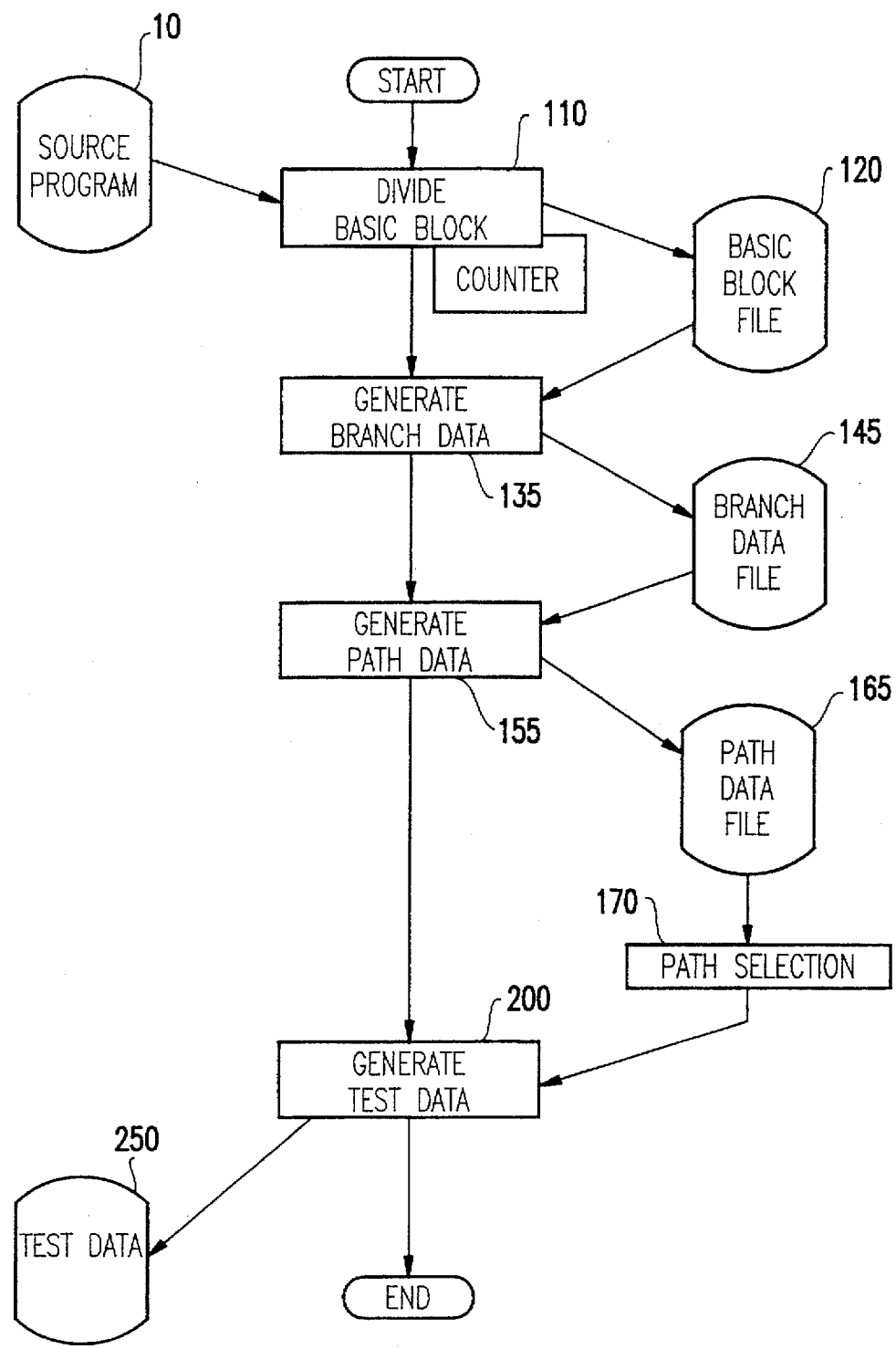
FIG. 29 is a block diagram showing the structure of a fourth embodiment according to the present invention.

As shown in FIG. 29, the present embodiment has a structure comprising a basic block dividing procedure section 110 for dividing a source program 10 including variable data about the substitution of a calling variable and the reference to the calling variable into basic blocks and storing the divided basic blocks in a basic block file 120, a branch data generating procedure section 135 for creating branch data including the variable data about variable calling in the source program and storing the created data in a branch data file 145, a path data generating procedure section 155 for generating information or data about respective paths for the source program from the branch data file 145 and storing the generated data in a path data file 165, a test path selecting procedure section 170 corresponding to a path data selecting procedure for selecting a path intended for the generation of evaluation or test data from the paths stored in the path data file 165, and a test data generating procedure section 200 corresponding to a test data generating procedure.

The branch data generating procedure section 135 employed in the present embodiment generates block numbers of branch addresses and branch conditions from the basic block file 120 in a manner similar to the branch data generating procedure sections 130 employed in the aforementioned embodiments. Further, the branch data generating procedure section 135 detects variable information or data about a calling variable for specifying a branch address of a program, an expression for operating or computing the variable, etc. and causes the detected data to be stored in the branch data file 145 as branch information or data. The branch data file 145 includes columns for function names of blocks, which are entered at every block in the branch data file 140, and columns for function names of blocks which respectively appear immediately before called blocks, as well as including these branch data.

As shown in FIG. 31, the path data file 165 comprises columns for numbers 166 of respective paths, block numbers 167 of basic blocks through which the paths pass, shift or branch conditions 168 of the basic blocks and variable data 169 thereof.

Figure 30:
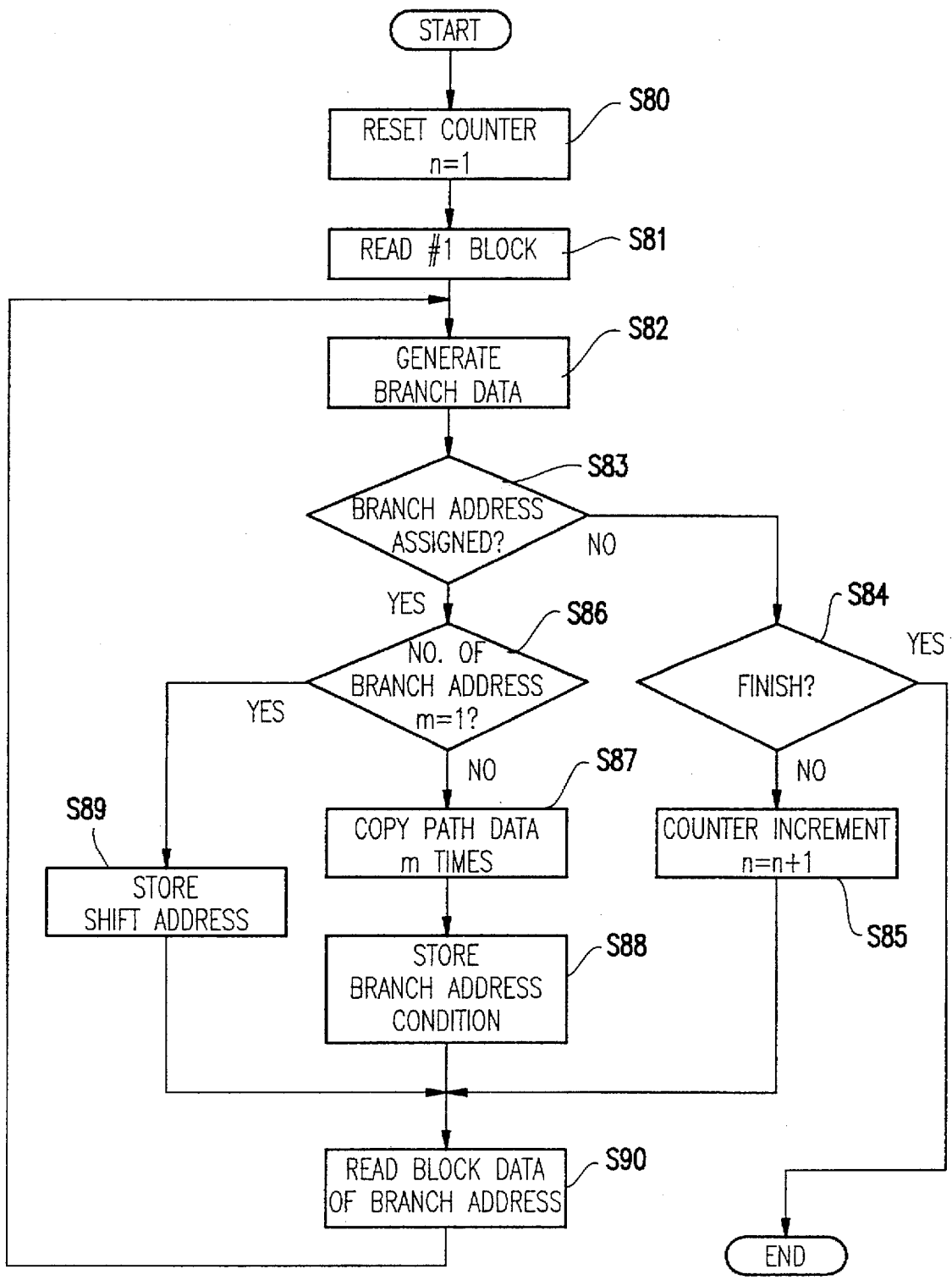
FIG. 30 is a flowchart for describing a sequential procedure of a path data generating procedure section 155.

A sequence of steps of the path data generating procedure section 155 will now be described. In FIG. 30, a counter for counting the number of paths n is first reset to 1 (S80). Further, a function name "START" defined as the first calling function of the source program is searched from the basic block file 120 and basic block data related to the searched function name is read (S81). Next, the branch data generating procedure section 135 generates branch block data from the read basic block data (S82). The process executed up to now is similar to that executed in each of the first through third embodiments. Thereafter, a frame of the branch block information is created and a basic block number 167 and variable information 169 only, such as a variable definition statement, an operation expression, etc. in the basic block data, are simply extracted and stored. Further, a block branch condition 168 is not yet entered. The following steps are executed as the sequence of steps of the path data generating procedure section 155. Namely, it is checked whether a jump and a branch to a basic block other than the immediately following basic block or the assignation of a basic block to a branch address by other instruction exist in the read basic block data (S83). If the answer is NO in S83, it is then checked whether or not non-processed path data exists (S84). If the answer is YES in S84, then a process of creating path data is finished. If the answer is NO in S84, then the number of paths counted by the counter is incremented by 1 (S85) and the routine procedure proceeds to the next path data creating processing. If the answer is YES in S83, it is then checked whether or not the number of branch addresses m is more than or equal to 2 (S86). If the number of branch addresses m is 1, then the corresponding branch address and condition ("NULL" or the like) are stored (S89) and basic block data of the branch address is read (S90). If the answer is YES in S86, then path data about a basic block n being in processing is copied by m−1 to create m path data in total (S87). Thereafter, the corresponding branch addresses and conditions are stored (S88). Next, basic block data of the branch addresses are read (S90). Thereafter, the routine procedure returns to the branch block data generating process (S82). The processing of (S82) to (S90) is repeated to generate path data about all the paths.

By using the path data file 165 generated by the path data generating procedure section 155, the test data generating procedure section 200 can generate test data for the source program over the overall paths without omission. It is however necessary to take into consideration the following points where the test data is created over the overall pass paths to evaluate the source program. Namely, when the source program is complex and the number of paths increases, a long period of time is required to generate the test data over the overall paths and evaluate the source program. Further, a system operation starting time is delayed. It is therefore of practical use that test data are generated and evaluated by removing redundant paths and selecting important paths alone in consideration of the degree of importance of paths to be tested or evaluated.

Figure 32:
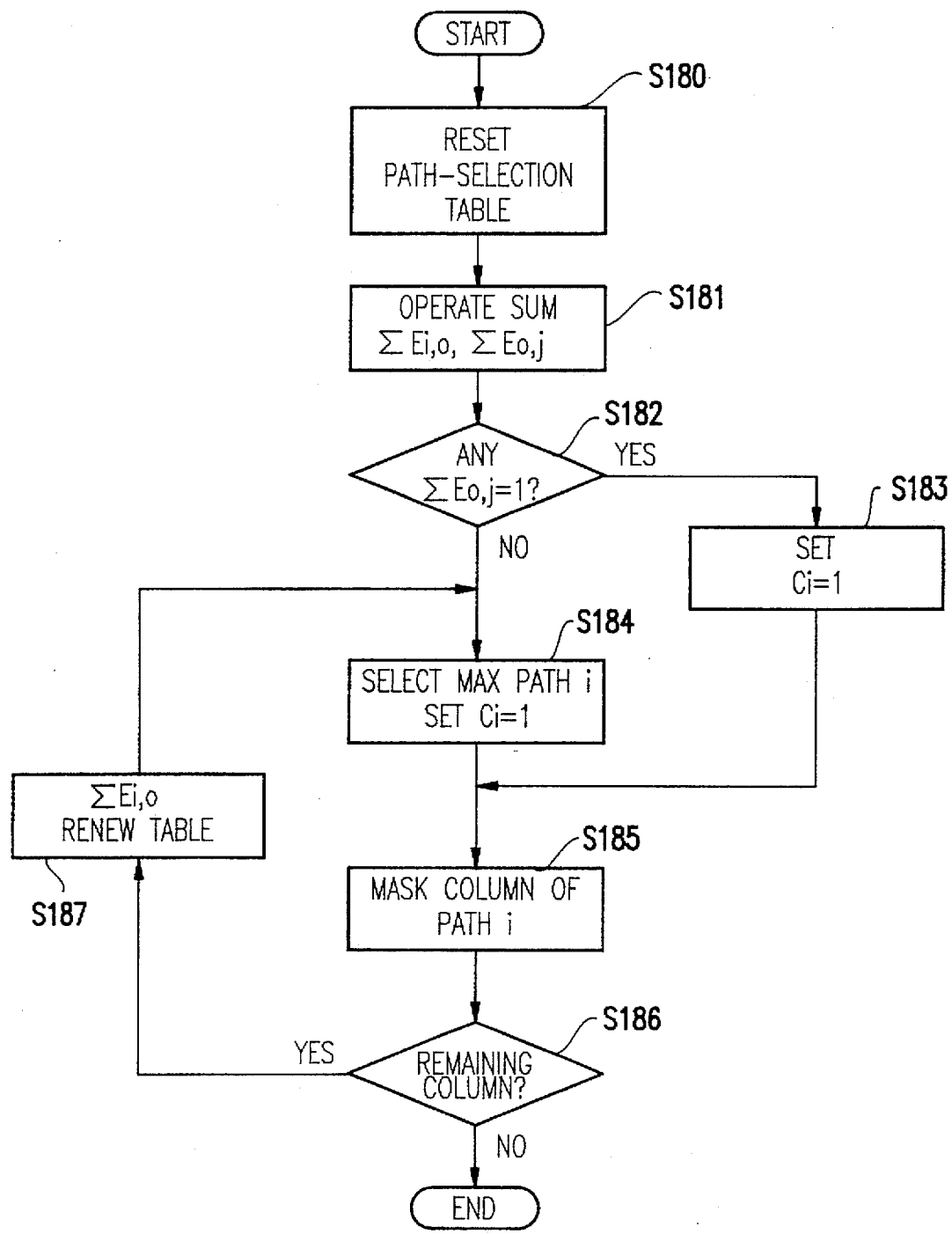
FIG. 32 is a flowchart for describing a sequential procedure of a test path selecting procedure section 170.

The test path selecting procedure section 170 serves as a procedure for selecting a path used for efficiently generating test data in the case referred to above. FIG. 32 shows one example of the procedure.

Figure 33:
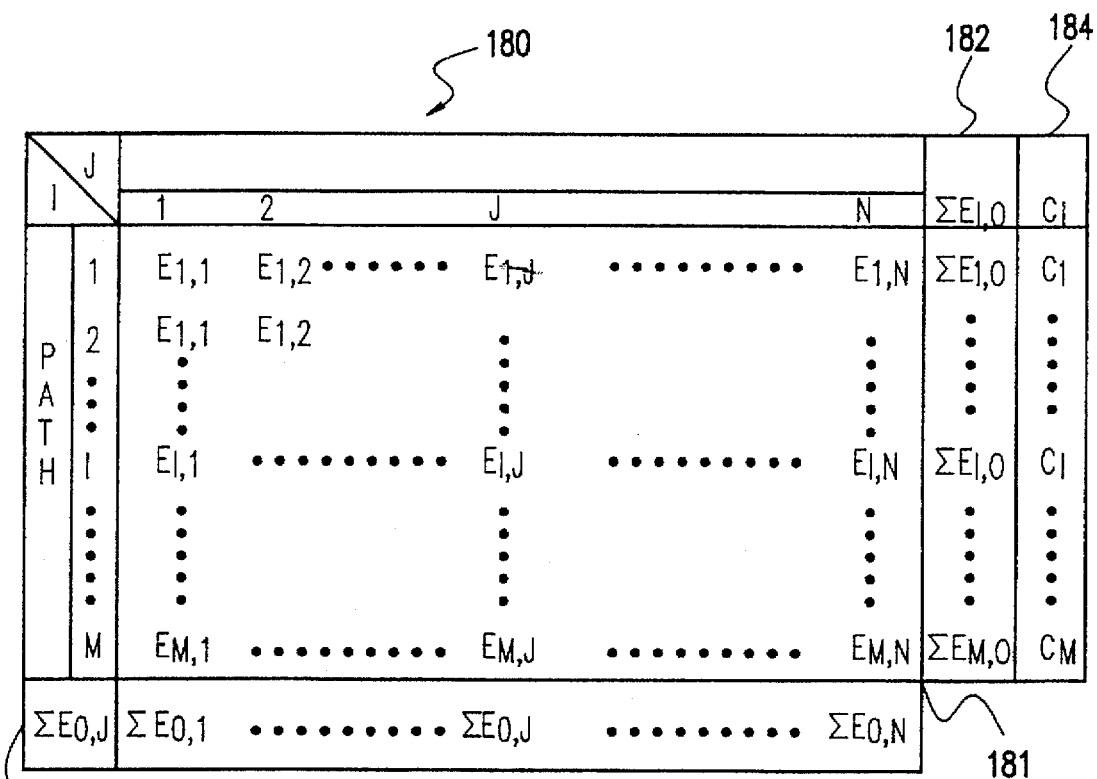
FIG. 33 is a view for describing the structure of a test path selection table 180.

A test path selection table 180 shown in FIG. 33, i.e., a working area is provided wherein m paths i (i=1 to m) are taken as rows, n basic blocks j (j=1 to n) are taken as columns and respective elements $E_{i,j}$ are arranged in the form of a matrix of m×n. Each element $E_{i,j}$ in the test path selection table 180 has "1" when the path i passes through the basic block j and "0" when the path i does not pass through the basic block j. Further, the test path selection table 180 comprises a column 181 for a path chart in which the elements $E_{i,j}$ are arranged in matrix form, a column 182 for $\Sigma E_{i,o}$ indicating the sum of values of the elements $E_{i,j}$, which is determined at every row, a column 183 for $\Sigma E_{o,j}$ indicating the sum of values of the elements $E_{i,j}$, which are determined at every column, and a column 184 for a select code $C_i$ in which the deletion of the path i is represented by "0" and the existence of the path i is represented by "1". Thus, the row sum $\Sigma E_{i,o}$ column 182 represents the number of basic blocks that pass every path and the column sum $\Sigma E_{o,j}$ column 183 represents the number of paths that pass every basic block.

FIG. 32 is a flowchart for describing the sequence of steps of the test path selecting procedure section 170 as one example.

First of all, "0" are respectively entered in the rows in the row sum column 182, the columns in the column sum column 183 and the select code columns 184 as the initial setup. Further, "1" or "0" are entered in all the elements $E_{i,j}$ of the path chart column 181 depending on whether or not the respective paths pass through the basic blocks (S180).

Next, the values (0 or 1) of the elements $E_{i,j}$ are summed every row and columns and the respective sums are entered in their corresponding row sum columns 182 and column sum columns 183 (S181).

It is further checked whether or not a basic block having the value of "1" exists in the column sum column 183 (S182). The value of the column sum $\Sigma E_{o,j}$, which corresponds to "1" shows that only one path i passes through the basic block j. Therefore, the path i is selected as an essential path which is an object for generating test data and the select code column $C_i$ with respect to a row of the path i is set to "1" indicating a "select" code (S183). If two or more basic blocks in which the value of the column sum $\Sigma E_{o,j}$ is 1 exists, then a process similar to the above is effected on all the paths that pass through the two or more basic blocks.

If the answer is NO in S182, then a path i for the maximum row sum $\Sigma E_{i,o}$ is selected from the row sum $\Sigma E_{i,o}$ column 182 and "0" entered in the select code column $C_i$ is set to "1" indicative of the "select" code (S184).

Next, a column of basic blocks j included in the respective paths i selected in accordance with the above procedure, i.e., all the basic blocks j in which the elements $E_{i,j}$ are taken as "1" for every row of path numbers i of these paths i, is masked on the path chart 181 (S185). In this case, the masked basic blocks j are evaluated based on evaluation or test data generated with respect to the selected paths i. Thus, paths comprised of the masked basic blocks j alone, of the paths other than the selected paths i, can be regarded as redundant paths in which basic blocks subjected to evaluation omissions are not produced even if the generation of the test data is omitted.

It is thereafter determined whether basic blocks, which have remained on the path chart 181 without being masked thereon, exist (S186). If the answer is NO in S186, then a path selecting process is finished. If the answer is YES in S186, then the row sum $\Sigma E_{i,o}$ column 182 of elements $E_{i,j}$ is calculated anew for each path alone, which include the remaining basic blocks, and the path selection table 180 is renewed (S187). Thereafter, the routine procedure returns to S184 where a path with respect to the maximum row sum $\Sigma E_{i,o}$ in the row sum $\Sigma E_{i,o}$ column 182 is selected. Thereafter, the procedure of S184 to S187 referred to above is repeated until a decision is made as to whether the non-masked basic blocks be deleted from or remain in all the paths.

A test path capable of efficiently evaluating the source program is selected without omitting all the basic blocks and including redundant test paths in accordance with the above procedure.

An embodiment in which the test path selecting procedure is applied to one source program in which the number of basic blocks n is 8 and the number of paths m is 6, will now be described as a fifth embodiment.

Figure 34:
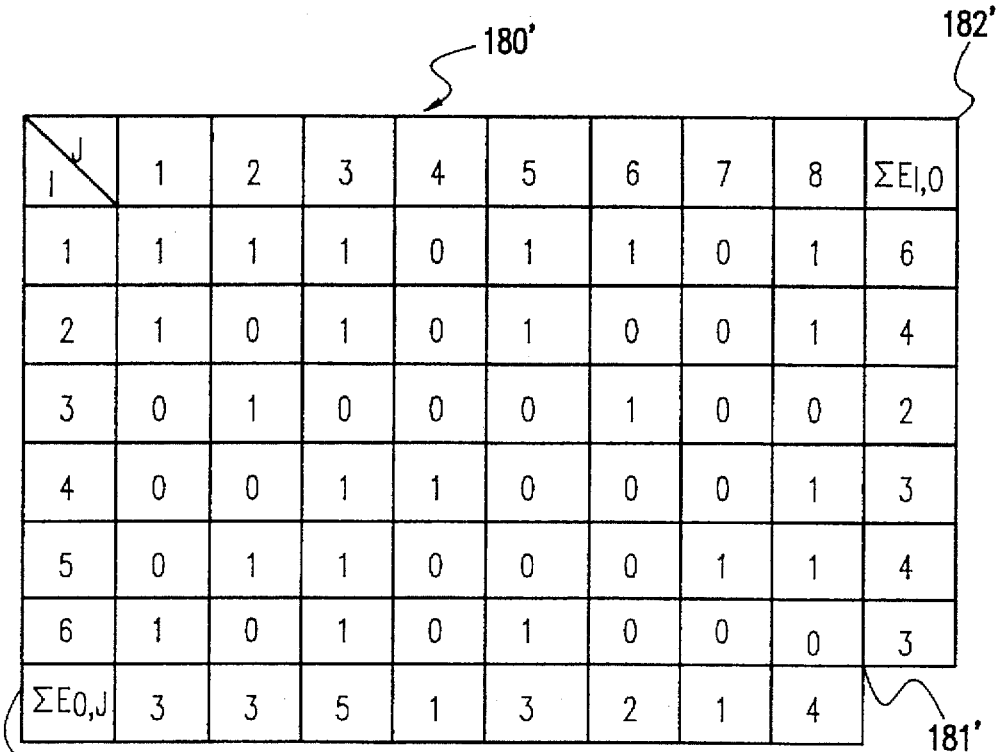
FIG. 34 is a view illustrating an initial state of a test path selection table 180 employed in a fifth embodiment.

FIG. 34 shows an initial state of a path selection table 180A created in accordance with steps of S180 and S181 employed in the fifth embodiment. For example, a path of a path number i=1 passes through basic blocks, which are represented by basic block numbers j=1, 2, 3, 5, 6 and 8, i.e., which are equal to the row sum $\Sigma E_{i,o}$=6. A path of a path number i=2 passes through basic blocks, which are represented by the basic block numbers j=1, 3, 5 and 8, i.e., which are equal to the row sum $\Sigma E_{i,o}$=4. Further, paths, which are represented by a path number i=1, 2 and 6, i.e., which are equal to $\Sigma E_{0,1}$=3, pass through the basic block of the basic block number j=1. Paths, which are represented by the path number i=1, 2, 4, 5 and 6, i.e., which are equal to $\Sigma E_{0,3}$=5, pass through the basic block of the basic block number j=3.

After the path selection table 180A has been created, it is then checked whether or not "1" exists in the column for a column sum 183A (S182). As a result, the basic block number j=4 and 7 are detected from the result of checking. Now, paths i, which pass through basic blocks of the basic block numbers 4 and 7, i.e., paths i in which $E_{i,4}$ and $E_{i,7}$ are both "1", are checked. It is thus understood that path numbers 4 and 5 correspond to the basic block numbers 4 and 7 from $E_{4,4}$ and $E_{5,7}$. Therefore, select codes $C_4$ and $C_5$ of the path numbers i=4 and 5 are both set to "1" (S183). The result of processing, which has been obtained up to now, is shown in FIG. 35(A).

Next, five columns in total, of basic blocks of the basic block numbers j=3, 4, 8 and 2, 3, 7 and 8 through which the paths 4 and 5 pass, are masked (S185). It is further checked whether or not columns of non-masked basic blocks exist (S186). As a result, three basic blocks of the basic block numbers j=1, 5 and 6 are detected. Therefore, row sums $\Sigma E_{1,0}$, $\Sigma E_{2,0}$, $\Sigma E_{3,0}$ and $\Sigma E_{6,0}$ related to the non-masked basic blocks alone are calculated with respect to four paths of the path numbers i=1, 2, 3 and 6 which pass through the non-masked basic blocks (S187). The result of calculation is represented as shown in FIG. 35(B).

Next, the maximum row sum is searched from the row sum 182A column. As a result, the row sum $\Sigma E_{i,o}$=3 is found. Therefore, the select code $C_i$ of the path number i=1 is set to 1 (S184). Thereafter, columns j=1, 5 and 6 of basic blocks in which elements $E_{i,j}$ of the path number i=1 are 1, are masked (S185). It is further checked whether columns of non-masked basic blocks still remain on the path selection table 180A (S186).

If the answer is YES in S186, then the procedure subsequent to S187 is repeated with respect to the paths which pass through the remaining basic blocks. Since, however, all the basic blocks j are masked in the present embodiment, a test path selecting process is finished. As a result, the paths 2, 3 and 6 are deleted from the path selection table as shown in FIG. 35(C) and hence the paths of the path numbers i=1, 4 and 5 with all the select coded $C_i$ as 1 are selected as the paths which are objects for generating test data. Further, since all the basic blocks 1 through 8 are included in at least any one of the paths, no evaluation omission takes place.

A method of generating data for evaluating a source program written in a C language, which is illustrated in FIG. 36 will now be described below as a sixth embodiment.

The source program written in the C language is processed based on a language processing program so as to be converted into an assembler program. The source program 10 converted into the assembler program is divided into basic programs in accordance with sequences of steps of both a basic block dividing procedure section 110 and a branch data generating procedure section 135 similar to those employed in the aforementioned embodiments. Branch information or data including variable data about a variable input and computation are extracted and generated as branch data files 145A through 145C shown in FIGS. 37(A) through 37(C).

Next, a path data table 165A and a path chart 181 of a test path selection table 180 both shown in FIGS. 38 and 39 are generated on the basis of the branch data files 145A through 145C in accordance with a sequence of steps of a path data generating procedure section 155. The path data table 165A shown in FIG. 38 is constructed in table form in such a manner that path numbers 166 provided along horizontal lines or rows, basic block numbers 167 provided along vertical lines or columns and their corresponding variable data 169 are respectively arranged in shift order of paths, straight lines with arrows indicate basic blocks passed through by the respective path so as to jump basic blocks which are not unpassed to be passed through, and branch conditions 168 under which each of the paths passes through the basic blocks, are entered in points where the rows and columns intersect.

These drawings show that, for example, a path 1 passes through basic blocks (1-1), (1-2), (2-1), (2-2), (2-4) and (1-4) and a path 3 passes through the basic block (1-1), basic blocks (1-3), (3-1), (3-2), (3-4) and the basic block (1-4). Further, a condition for passing through the basic block (1-1) is that variables "data 1" defined based on "data 1=buf 1+buf 2+1" of variable data 169 are both less than or equal to "100" with respect to the paths 1 and 2 and are more than "100" with respect to the paths 3 and 4 as shown in FIG. 38. Similarly, a condition for passing through the basic block (2-1) is that a variable "data 2" is less than or equal to "200" with respect to the path 1 and is greater than "200" with respect to the path 2.

FIG. 39 is a view illustrating the relationship between the respective paths and the basic blocks shown in FIG. 38 in the form of the path chart 181 of the path selection table 180. Namely, it is understood that the source program is divided into twelve basic blocks j=(1-1) through (3-4) and is executed through four paths i=1 through 4 that continuously pass through these basic blocks. It is now checked based on a sequence of steps of a test path selecting procedure section 175 whether or not a path that is able to omit the generation of test data exists in the four paths 1 through 4. It is thus understood that since each of the basic blocks (2-2), (2-3), (3-2) and (3-3) passes through any one of the paths 1 through 4, no eliminable paths exist to evaluate the basic blocks without omission.

Figure 40A:
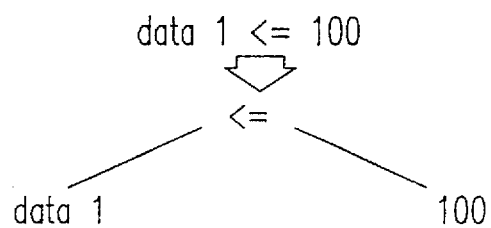
FIGS. 40(A) through 40(C) and 41(A) through 41(D) are respectively views for describing binary trees of the source program employed in the sixth embodiment.
Figure 40B:
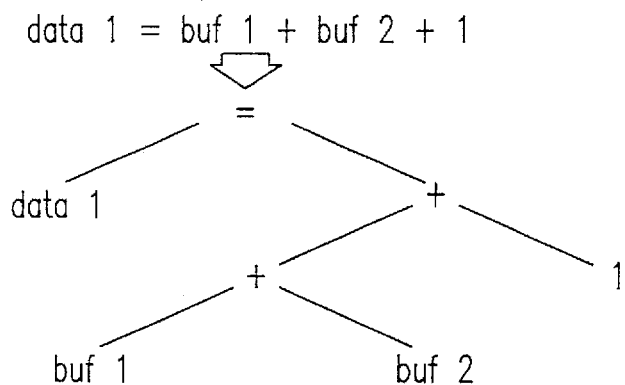
Figure 40C:
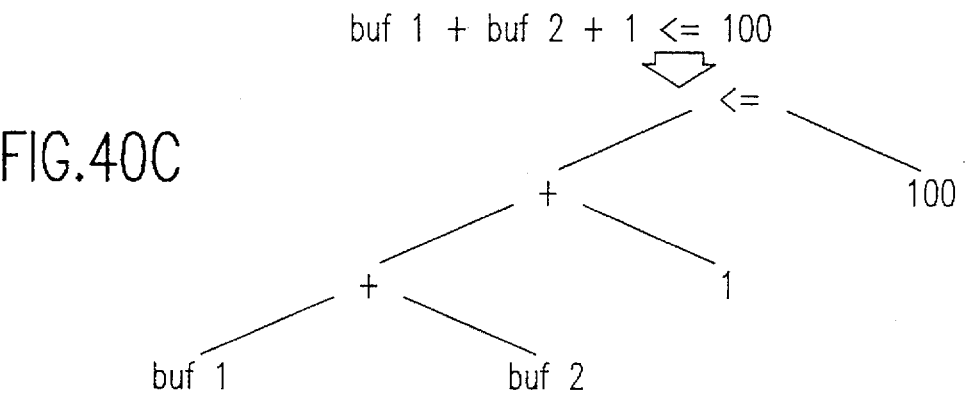

Each of the branch conditions 168 can be developed using the variable data 169 so as to be represented in the form of a structure called a binary tree employed in a language processing technique on a standard basis. FIGS. 40 and 41 respectively illustrate examples of binary-tree structures.

Referring to the test paths 166 shown in FIG. 38, a branch condition for causing test data to pass from the basic block (1-1) to the basic block (1-2) is that "data 1<=100", i.e., the variable "data 1" is less than or equal to "100". However, the variable "data 1" is subjected to a variable substitution and computation process in accordance with "=buf 1+buf 2+1". Eventually, the variable "data 1" is represented as being "buf 1+buf 2+1<=100". This means that FIG. 40(C) can be obtained by replacing "data 1" corresponding to the left side of a node "<=" in FIG. 40(A) with the right side of a node "=" in FIG. 40(B). Going further back to the past, the "buf 1" and "buf 2" are set by functions "fscanf" including them immediately before the setting of the "data 1". Therefore, test data, which passes from the basic blocks (1-1) to the basic block (1-2) is created by providing data "buf 1" and "buf 2" which satisfy the branch condition "buf 1"+"buf 2"+1<=100.

Figure 41A:
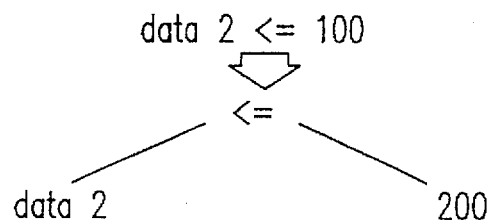
Figure 41B:
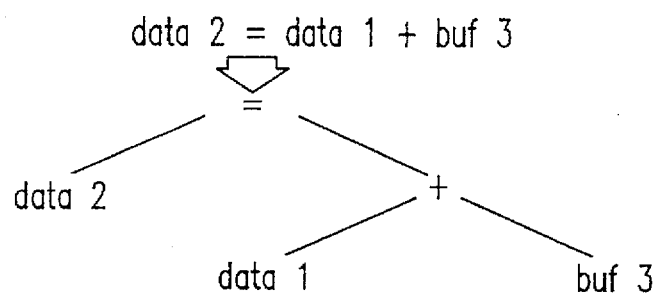
Figure 41C:
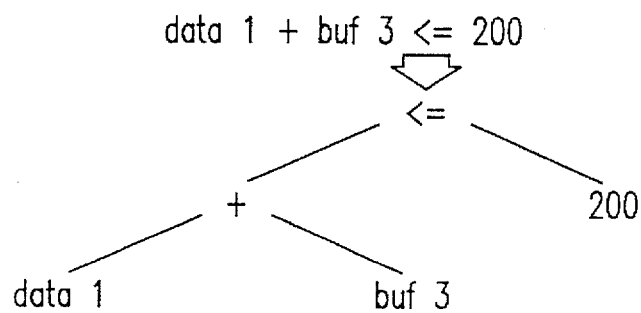
Figure 41D:
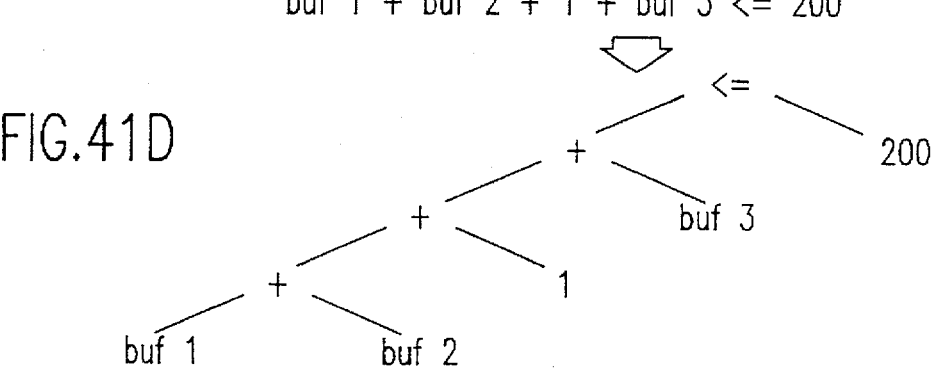

Similarly, FIGS. 41(A) through 41(D) respectively show the progress of analytical processing of a branch condition "data 2>200" under which test data passes from the basic block (2-1) to the basic block (2-3). "data 2<=200" is first read from branch data to create a node shown in FIG. 41(A). "data 2=data 1+buf 3" is then read from variable data to generate a node shown in FIG. 41(B). Thereafter, a binary tree shown in FIG. 41(C) is created by substituting the generated node of "data 2" in FIG. 41(A). Further, FIG. 41(D), i.e., "buf 1+buf 2+1+buf 3<=200" is obtained by substituting FIG. 40(B) in "data 1" of the binary tree shown in FIG. 41(C). Thus, the data of "buf 1", "buf 2" and "buf 3", which satisfy the aforementioned condition and this condition, can be obtained as the intended test data for the source program.

It is to be understood that variations and modifications of the illustrative embodiments of the invention disclosed herein will be evident to those skilled in the art. It is intended that all such modifications and variations be included within the scope of the appended claims.

What is claimed is:

1. A method of generating data for evaluating a source program, comprising the following processes:

a program dividing process of reading the source program for controlling the operation of an information processing system, dividing the source program into program blocks each time a branch instruction is detected and dividing the source program into said program blocks each time a label is detected and generating basic block data for every program block;

a branch data generating process of generating branch data between the program blocks, for shifting from one program block to another program block, based on the basic block data and storing said generated branch data;

an arrival data generating process of generating an arrival data, by connecting said branch data, for allowing said source program to continue from the beginning to the individual program blocks and outputting the generated arrival data; and a test data generating process of generating data for testing said source program based on said arrival data.

2. The method as claimed in claim 1, wherein each of said program blocks includes at least one basic block divided by said branch instruction and said label and at least one compound block comprising two or more basic blocks.

3. The method as claimed in claim 1, wherein said source program is written in a language including a statement for generating and maintaining the source program.

4. A method of generating data for evaluating a source program, comprising:

a program dividing process of reading the source program for controlling operation of an information processing system, dividing the source program into program blocks each time a branch instruction is detected and dividing the source program into said program blocks each time a label is detected and generating basic block data for every program block;

a variable data extracting process of extracting variable data for substituting and referring to a calling variable in the source program;

a branch data generating process of generating branch data between the program blocks, for shifting from one program block to another program block, based on the basic block data and storing said generated branch data;

a path data generating process of generating path data indicating a path for processing the source program for each flow of the source program in a sequential order of the program blocks, based on said branch data; and a test data generating process of generating data for testing said source program, based on said path data and said variable data.

5. The method as claimed in claim 4, further including:

a path selecting process of selecting a test path corresponding to a test data generating object from the path data in accordance with a predetermined reference; and a test data generating process of generating test data from data about the test path selected by said path selecting process and the variable data.

6. The method as claimed in claim 5, wherein a path selection reference is set so as to evaluate the program blocks without omission and minimize the number of paths to be selected.

7. The method as claimed in claim 4, wherein each of said program blocks includes at least one basic block divided by said branch instruction and said label and at least one compound block comprising two or more basic blocks.

8. The method as claimed in claim 4, wherein said source program is written in a language including a statement for generating and maintaining the source program.

* * * * *